(12) United States Patent
Carus et al.

(10) Patent No.: US 9,672,206 B2
(45) Date of Patent: Jun. 6, 2017

(54) APPARATUS, SYSTEM AND METHOD FOR APPLICATION-SPECIFIC AND CUSTOMIZABLE SEMANTIC SIMILARITY MEASUREMENT

(71) Applicants: Alwin B Carus, Waban, NY (US); Thomas J. DePlonty, Melrose, MA (US)

(72) Inventors: Alwin B Carus, Waban, NY (US); Thomas J. DePlonty, Melrose, MA (US)

(73) Assignee: Information Extraction Systems, Inc., Waban, MA (US)

( * ) Notice: Subject to any disclaimer, the term of this patent is extended or adjusted under 35 U.S.C. 154(b) by 35 days.

(21) Appl. No.: 14/727,451

(22) Filed: Jun. 1, 2015

(65) Prior Publication Data

US 2016/0350283 A1    Dec. 1, 2016

(51) Int. Cl.
| | | |
|---|---|---|
| *G06F 17/27* | (2006.01) | |
| *G10L 15/00* | (2013.01) | |
| *G10L 15/26* | (2006.01) | |
| *G10L 21/00* | (2013.01) | |
| *G06F 17/30* | (2006.01) | |

(52) U.S. Cl.
CPC ........ *G06F 17/2785* (2013.01); *G06F 17/277* (2013.01); *G06F 17/30731* (2013.01)

(58) Field of Classification Search
None
See application file for complete search history.

(56) References Cited

U.S. PATENT DOCUMENTS

| | | |
|---|---|---|
| 5,694,592 A | 12/1997 | Driscoll |
| 6,098,033 A | 8/2000 | Richardson et al. |
| 6,810,376 B1 | 10/2004 | Guan et al. |

(Continued)

OTHER PUBLICATIONS

Google Books Ngram Viewer data download. http://storage.googleapis.com/books/ngrams/books/datasetsv2.html.

(Continued)

*Primary Examiner* — Satwant Singh
(74) *Attorney, Agent, or Firm* — Schmeiser, Olsen & Watts LLP; Anthony L. Meola

(57) ABSTRACT

The present invention relates to an apparatus system and method for creating a customizable and application-specific semantic similarity utility that uses a single similarity measuring algorithm with data from broad-coverage structured lexical knowledge bases (dictionaries and thesauri) and corpora (document collections). More specifically the invention includes the use of data from custom or application-specific structured lexical knowledge bases and corpora and semantic mappings from variant expressions to their canonical forms. The invention uses a combination of technologies to simplify the development of a generic semantic similarity utility; and minimize the effort and complexity of customizing the generic utility for a domain- or topic-dependent application. The invention makes customization modular and data-driven, allowing developers to create implementations at varying degrees of customization (e.g., generic, domain-level, company-level, application-level) and also as changes occur over time (e.g., when product and service mixes change).

58 Claims, 23 Drawing Sheets

(56) References Cited

U.S. PATENT DOCUMENTS

| | | | |
|---|---|---|---|
| 7,472,121 B2 | 12/2008 | Kothari et al. | |
| 7,756,871 B2* | 7/2010 | Yacoub | G06K 9/00469 707/736 |
| 8,170,969 B2 | 5/2012 | Roettger et al. | |
| 8,380,511 B2* | 2/2013 | Cave | G10L 15/1815 704/238 |
| 8,468,160 B2 | 6/2013 | Hassanzadeh et al. | |
| 8,775,442 B2 | 7/2014 | Moore et al. | |
| 9,032,392 B2* | 5/2015 | Glover | G06F 8/61 717/176 |
| 9,326,116 B2* | 4/2016 | Kandekar | G06Q 30/0214 |
| 9,330,186 B2* | 5/2016 | Glover | G06F 8/61 |
| 2005/0240413 A1* | 10/2005 | Asano | G06F 17/2785 704/270 |
| 2012/0303358 A1 | 11/2012 | Ducatel et al. | |
| 2013/0311487 A1 | 11/2013 | Moore et al. | |
| 2014/0101171 A1 | 4/2014 | Danielyan et al. | |
| 2015/0019541 A1 | 1/2015 | Carus et al. | |
| 2016/0042061 A1* | 2/2016 | Sengupta | G06F 17/278 707/738 |
| 2016/0210331 A1* | 7/2016 | Glover | G06F 8/61 |
| 2016/0357731 A1* | 12/2016 | Zorzin | G06F 17/2785 |
| 2017/0039176 A1* | 2/2017 | Broderick | G06F 17/277 |

OTHER PUBLICATIONS

"Distributional semantics". http://en.wikipedia.org/wiki/Distributional_semantics.

"Random indexing". http://en.wikipedia.org/wiki/Random_indexing.

"Pointwise mutual information". http://en.wikipedia.org/wiki/Pointwise_mutual_information.

S. Patwardhan and T. Pedersen. (2006). "Using WordNet Based Context Vectors to Estimate the Semantic Relatedness of Concepts"; Proceedings of the EACL 2006 Workshop Making Sense of Sense—Bringing Computational Linguistics and Psycholinguistics Together, pp. 1-8, Apr. 4, 2006, Trento, Italy.

S. Fernando and M. Stevenson. (2008). "A semantic similarity approach to paraphrase detection"; Computational Linguistics UK (CLUK 2008) 11th Annual Research Colloquium.

C. Banea, S. Hassan, M. Mohler, R. Mihalcea. (2012) "UNT: A Supervised Synergistic Approach to Semantic Text Similarity"; First Joint Conference on Lexical and Computational Semantics (*SEM 2012): 635-642.

L. Han, A. Kashyap, T. Finin, J. Mayfield, J. Weese. (2013). "UMBC Ebiquity-Core: Semantic Textual Similarity Systems"; Proceedings of the Second Joint Conference on Lexical and Computational Semantics, vol. 1: 44-52.

\* cited by examiner

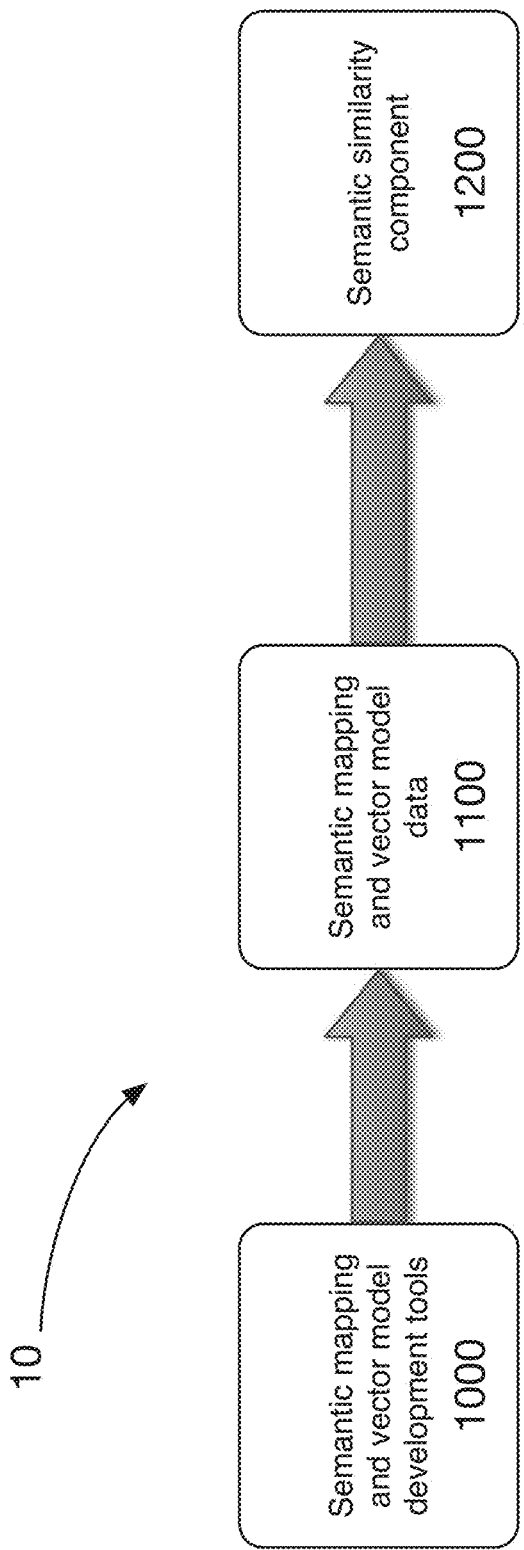

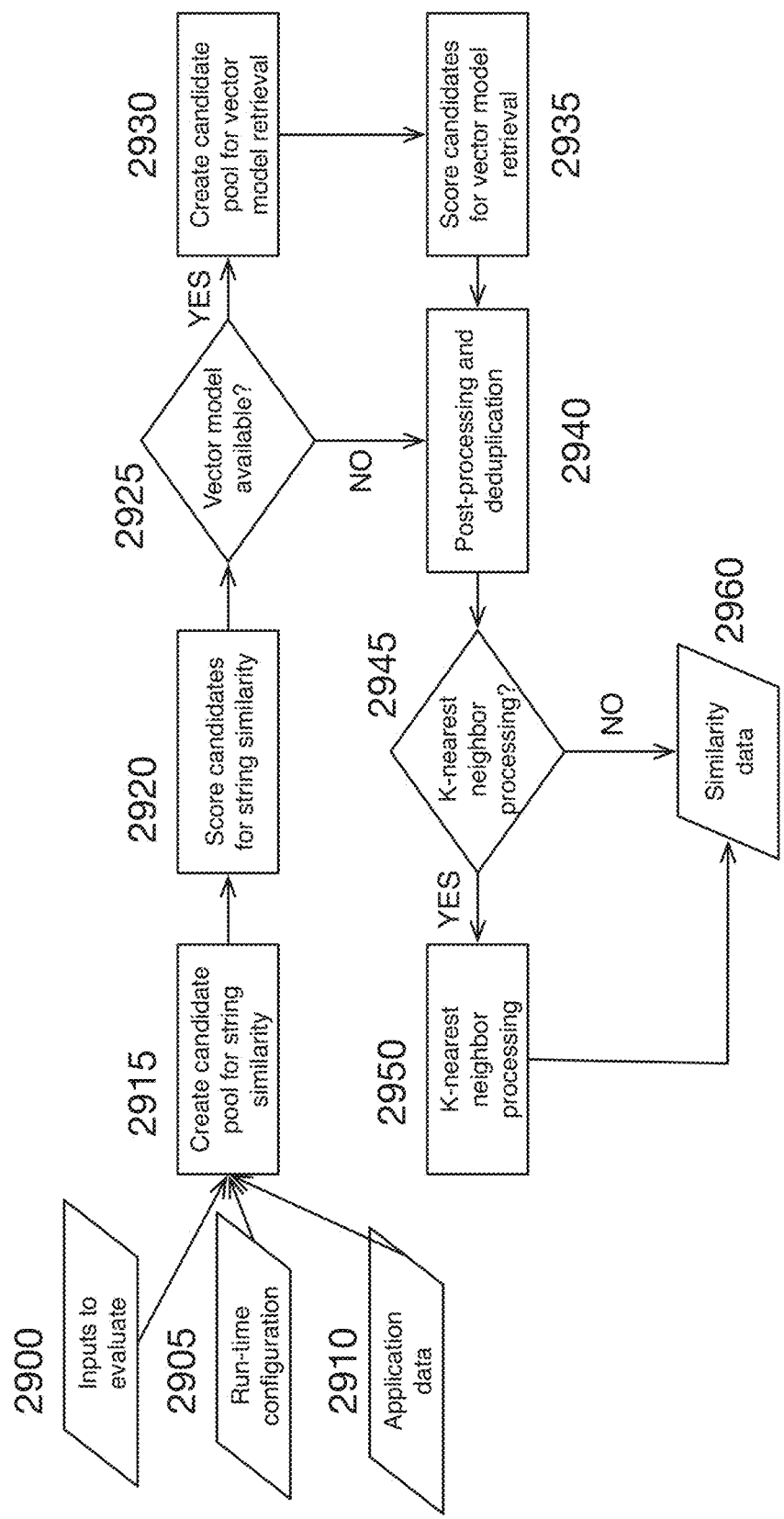

APPARATUS, SYSTEM AND METHOD FOR APPLICATION-SPECIFIC AND CUSTOMIZABLE SEMANTIC SIMILARITY MEASUREMENT

BACKGROUND

1. The Field of the Present Invention

The present invention relates to an apparatus system and method for creating a customizable and application-specific semantic similarity utility that uses a single similarity measuring algorithm with data from broad-coverage structured lexical knowledge bases (for instance, dictionaries and thesauri) and corpora (document collections). More specifically the invention includes the use of data from custom or application-specific structured lexical knowledge bases and corpora and semantic mappings from variant expressions to their canonical forms.

2. General Background

Measures of the semantic similarity of words, phrases and texts are widely used by natural language processing (NLP) applications. For example, supplying terms semantically similar to query terms is used for query expansion to improve the recall of information retrieval applications. Similarly, organizing and filtering results by their semantic similarity to a query or to each other enhances the performance of question answering systems.

Likewise, ranking text passages of documents by semantical similarity improves the relevance of summaries of document summarization applications. Recognizing semantically similar questions and relevant answers improves the quality of technical and customer support systems.

It is widely understood that semantic similarity is not an all-or-nothing phenomenon. Words are semantically related to each other in multiple ways and may be more or less similar to each other. There are several the major types of semantic similarity, paradigmatic (substititional and structural) and syntagmatic (associative), and their sub-types.

Grammatical classes (most prominently parts of speech and inflectional classes) and synonymy (words that are possible replacements or substitutes for other words without changing the core or essential meaning of an expression) are two prominent examples of substitutional similarity. However, there are a wide range of types of structural similarity found in language. The English WordNet, for example, has organized the English lexicon on empirical psycholinguistic principles.

Associative similarity, on the other hand, is represented by words and phrases that are related to each other not because they are mutually substitutable or otherwise disciplined by syntactic or morphological patterns, but rather by virtue of their frequent co-occurrence. They are related to each other topically.

Semantic Relations in Structured Knowledge Bases

The most fully developed and widely used broad-coverage structured lexical knowledge base in English is WordNet. Corresponding versions have been developed for many other languages.

The most significant semantic relations in WordNet are:
(a) containment relations (set and instance containment=hypernymy and hyponymy; and member, part and substance containment=holonymy and meronymy); these relations play a major large in organizing nouns; and
(b) polarity (and antonymy); these relations play a major role in organizing in adjectives; and entailment; these relations play a major role in organizing in verbs.

WordNet also identifies other systematic semantic regularities in English such as agent, action, beneficiary, cause, experiencer, goal, location, patient, product, and result. Later versions of WordNet include derivational links between senses in different parts of speech.

Other broad-coverage structured lexical knowledge bases are the language- and culture-specific encyclopedic Wikipedia. A Wikipedia is not organized like a WordNet. First, entries are texts rather than senses with associated glosses. Second, entries are linked to other entries by hyperlinks (that is, undecorated links between entries in a Wikipedia). Finally, entries are decorated with a very rich variety of category labels. However, very limited editorial effort has been applied to structure the Wikipedia categories themselves.

Research projects using Wikipedia as a structured lexical knowledge base for semantic processing have consistently found that the entry text itself is a better predictor of semantic similarity than the links and categories applied to the entries.

The Need for Application-Specific Semantic Measures

In spite of the critical importance of semantic similarity to natural language applications, applications often have been unable to exploit domain- or application-specific semantic similarity measures.

First, broad-coverage semantic resources such as general-purpose dictionaries or large Web-based corpora have inadequate coverage of the terms and concepts used by an application. Second, structured lexical knowledge bases are often unavailable for the given domain. Third, domain- and application-specific corpora are usually small and consequently have poor lexical (and corresponding conceptual) coverage.

Broad-coverage monolingual dictionaries and semantic lexicons such as WordNet do provide good terminological and semantic coverage of the core concepts of a language. And some more specific and even domain-specific nomenclatures are now widely available, especially since the development of thesaurus standards such as ISO 25964 and the W3 SKOS standard.

Some examples of these thesauri are the US National Institute of Health SNOMED and MeSH medical nomenclatures; the US Geologic Survey's general purpose and biocomplexity thesauri; the United Nations' UNESCO thesaurus; and the Getty Research Institute's Art and Architecture thesaurus.

Nevertheless, none of these dictionaries and thesauri provides the terminological breadth and depth appropriate for a specific application. For example, none of these lexical resources provides coverage for the products and services of a company including how these products and services are related to each other; the locations of stores and outlets; and company-specific terminology; and so forth. A lexical resource for Apple, for instance, would be expected to have an exhaustive list of Apple's hardware (iMac computers, MacBook and Mac Air laptops, iPad tablets, iPhone cell phones) and software (IOS and OS X operating systems, Apple and third-party applications and apps); store and service locations; and Apple-specific terminology (such as the Apple "genius" and "Genius Bar" for in-store technical support and repair). In other words, application-specific lexical knowledge from structured and unstructured sources is need to supplement broad-coverage lexical knowledge and documents.

User and support documentation are obvious sources of application-specific terminology. However, the amount of precise semantic information that can be gleaned from them using statistical techniques is limited by their relatively small size. Furthermore, this kind of documentation is dynamic. It is not static, but changes, often significantly, as products and services change over time.

Consequently, applications that benefit from domain- or application-specific semantic measures have few options. If any resources are used at all, they are:

broad-coverage, un-customized lexical resources;

limited amounts of application-specific documentation; and powerful, but less-than-adequate string similarity algorithms to measure text (not semantic) similarity.

Combining broad-coverage and application-specific information is clearly beneficial for measuring semantic similarity.

First, as a rule very large amounts of corpus data are needed to outperform well-designed structured knowledge bases such as WordNet. Second, typically only relatively small amounts of document corpus data are available for applications. These corpora may be many orders of magnitude smaller than what is needed to construct effective data for measuring the semantic similarity of many terms. Third, in spite of their effectiveness, broad-coverage structured lexical knowledge bases often have deficient lexical coverage for a given application; application-specific information can compensate for these lexical gaps. Fourth, it is possible to compare the performance of a non-customized to a customized system and empirically determine the relative benefit that adding customization information provides. This is especially important since the labor and cost of developing document corpora; and of creating lexical knowledge must be taken into account. So broad-coverage structured lexical knowledge bases are a good place to start.

Yet custom document corpus data are also very important and especially for the development of custom lexical data. Techniques used to generate a vector space model from corpora can also produce statistics and other data that can be used to develop custom semantic relations. In particular, the single- and multi-part lexemes from the document corpus are candidates for creating custom vocabulary. A combination of corpus-based frequency and weighting techniques and term clustering can assist the developer in identifying the most important terms to incorporate; and can provide clues about how they should be organized in the lexical knowledge base (in particular, which terms are semantically similar).

As such, there is a need for techniques and data to produce a combination of broad-coverage and application-specific and customizable similarity measurement.

There is also a need for a single, unified approach to measuring semantic similarity from both structured lexical knowledge bases and corpora.

There is also a need for organizing and customizing data for measuring semantic similarity by supplementing by (i) the initial broad-coverage lexical knowledge base augmented with application-specific terms; glosses for these terms; and relations among these terms and terms in the broad-coverage lexical knowledge base; and (ii) the initial broad-coverage corpus augmented with application-specific document corpus data.

SUMMARY OF THE INVENTION

We have invented an apparatus, system and method for creating a customizable and application-specific semantic similarity utility that uses a single similarity measuring algorithm with data from broad-coverage structured lexical knowledge bases (dictionaries and thesauri) and corpora (document collections); along with data from custom or application-specific structured lexical knowledge bases and corpora; and semantic mappings from variant expressions to their canonical forms.

In a first aspect, the present invention includes a method for application-specific and customizable text similarity measurement, including determining a string similarity score of at least two texts based upon a string similarity database, said at least two texts comprising at least one input text and at least one target text; determining a semantic similarity score of the at least two texts based upon a semantic similarity database, the semantic similarity score being determined as the sum of a distance between at least one term of each said at least two texts; mapping said at least one target text and its respective canonical representations in a mappings database; and combining the string similarity score and the semantic similarity score of the at least two texts where the combined score is a weighted sum of the string similarity score and the semantic similarity score and where said at least two texts are ranked for similarity by sorting by their respective combined string and semantic similarity scores and where said texts that are included in the mappings database are also scored by similarity of their canonical forms.

Some embodiments include determining string similarity as the weighted substring similarity of the at least two texts, determining a plurality of sizes of substring, determining substring weighting with tf-idf and determining substring similarity with cosine distance.

Some embodiments include determining a semantic similarity score of the at least two texts as the sum of a semantic distance between at least two terms of the at least two texts, selecting a structured lexical knowledge base that contains definitions, and re-representing said structured lexical knowledge base in a computationally tractable form.

In some embodiments the structured lexical knowledge base includes object-attribute-value (OAV) triplets that relate terms (objects) to properties (values) by relations (attributes).

Some embodiments include a constructing a first gloss corpus consisting of the definitions for each said term in the lexical knowledge base; constructing a second gloss corpus including at least one expanded definition for each said term in said structured lexical knowledge base by adding to each of respective definition of said terms found in a specified set of semantic relationships to each respective term and extracting said semantic relationships from the set of OAV triplets.

In some embodiments the semantic relations between the said terms used to construct the second gloss corpus include terms related by synonymy; hypernymy and hyponymy; and morphological derivation.

In some embodiments the string similarity data comprises a database of substrings of texts and statistics that relate said substrings to variant forms of each canonical form, and where said substrings are character ngrams of the target texts, respectively. There can also be a plurality of sizes of character ngrams where they have tf-idf weights.

In some embodiments the method includes correlating each character ngram to each of the target texts in which it is respectively found.

In some embodiments the method includes creating a sample set of documents from a preferred set of collected documents, converting the sample set of documents to a standardized format, removing text markup from the converted sample set of documents, converting characters to a uniform character set.

In some embodiments the sample set of documents is segmented into sections, the sample set of documents is tokenized where said tokens are single or multiple word tokens, the tokens are transformed by stemming or baseforming, the tokens are transformed by capitalization folding, the specified tokens are ignored, the tokens are decorated with additional data and the additional data is selected from the group consisting of part-of-speech, syntactic, named-entity and semantic labels. In some embodiments multiword-tokens are identified as a sequence of two or more tokens with high mutual information and the multiword-tokens are found in a pre-defined list of multiword tokens.

Some embodiments include determining co-occurrence statistics to create a base model of term co-occurrence statistics from the tokenized text based on a configuration, where the number of terms to the left and right of a given focus term to use for term co-occurrence counts, and where the semantic similarity data module uses a semantic indexing vector space model of term co-occurrence.

Some embodiments include creating a first vector space model based upon the structured lexical knowledge base and the first gloss corpus, where the first vector space model is also based upon the second gloss corpus.

Some embodiments include the first vector space model is a "first-order" vector space model of term co-occurrences from at least one of a broad-coverage structured lexical knowledge base or a domain- or application-specific lexical knowledge base that contains glosses of said terms.

Some embodiments include creating a second vector space model of term co-occurrences for each term defined in the lexical knowledge base by summing co-occurrence vectors of each term found in the expanded gloss corpus for the given term, also including removing low frequency co-occurrences and removing low variance co-occurrences.

In some embodiments the method includes creating a third vector space model based upon the sample set of documents, said third vector space model being a "first-order" vector space model.

Some embodiments there is a fourth vector space model where the fourth vector space model includes a combination of one or more vector space models drawn from a pool of lexical knowledge base and document collection vector space models and where the fourth vector space model is a weighted sum of at least one of the second and third vector space models.

Some embodiments include semantic distance being determined using the fourth vector space model of weighted term co-occurrence statistics, where the fourth vector space model uses random indexing, where the weighted term co-occurrence statistics includes pointwise mutual information, and where the semantic distance includes a measure of correlation cosine distance.

In some embodiments the method includes combining vector distances using a best alignment strategy whereby said terms in the at least two texts are allowed by contributing their respective distances only once and only with their respective highest matching scores, where the at least two texts are ranked for similarity by sorting by their respective combined string and semantic similarity scores, where a score of canonical forms is determined by a k nearest neighbor score, and where the score of canonical forms is determined as the sum of the scores of the k closest matching variant strings of canonical forms and further where k is a fixed number.

In some embodiments the canonical form is the normalized form of the target text the metadata and categories are associated with canonical forms, and the metadata includes the frequency of occurrence of each combination of metadata and categories.

In some embodiments the mappings database stores the at least one text and its respective canonical representation comprises semantic mappings between said text and its respective normative forms, where the string similarity databases comprises substrings of texts and statistics that relate said substrings to variant forms.

In a second aspect, the invention includes a data processing system for application-specific and customizable text similarity measurement having logic for determining a string similarity score of at least two texts based upon a string similarity database, said at least two texts comprises at least one input text and at least one target text; logic for determining a semantic similarity score of the at least two texts based upon a semantic similarity database, the semantic similarity score being determined as the sum of a distance between at least one term of each said at least two texts; logic for mapping said at least one target text and its respective canonical representations in a mappings database; and logic for combining the string similarity score and the semantic similarity score of the at least two texts where the combined score is a weighted sum of the string similarity score and the semantic similarity score and where said at least two texts are ranked for similarity by sorting by their respective combined string and semantic similarity scores and where said texts that are included in the mappings database are also scored by similarity of their canonical forms.

In a third aspect, the invention includes a system useful for application-specific and customizable text similarity measurement, including a first computer store containing at least two texts defining string similarity of each of said texts, said at least two texts comprising at least one input text and at least one target text, where said defined string similarity is stored as a string similarity score in said first computer store; a second computer store interconnected to the first computer store and housing a semantic similarity score of the at least two texts based the first computer store, where the semantic similarity score is determined as the sum of a distance between at least one term of each said at least two texts; a third computer store interconnected to the first and second computers stores where said at least one target text and its respective canonical representations are mapped and housed in said third computer store; and wherein the string similarity score and the semantic similarity score of the at least two texts where the combined score is a weighted sum of the string similarity score and the semantic similarity score and where said at least two texts are ranked for similarity by sorting by their respective combined string and semantic similarity scores and where said texts that are included in the mappings database are also scored by similarity of their canonical forms.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

FIG. 2a shows three components: the semantic mapping and vector model development tools component; the semantic mapping and vector model data component; and the semantic similarity component, according to one embodiment of the present invention;

FIG. 19 shows a flow diagram detailing a process for performing semantic matching in run-time according to one embodiment of the present invention.

DETAILED DESCRIPTION OF THE PREFERRED EMBODIMENTS

Figure 1:
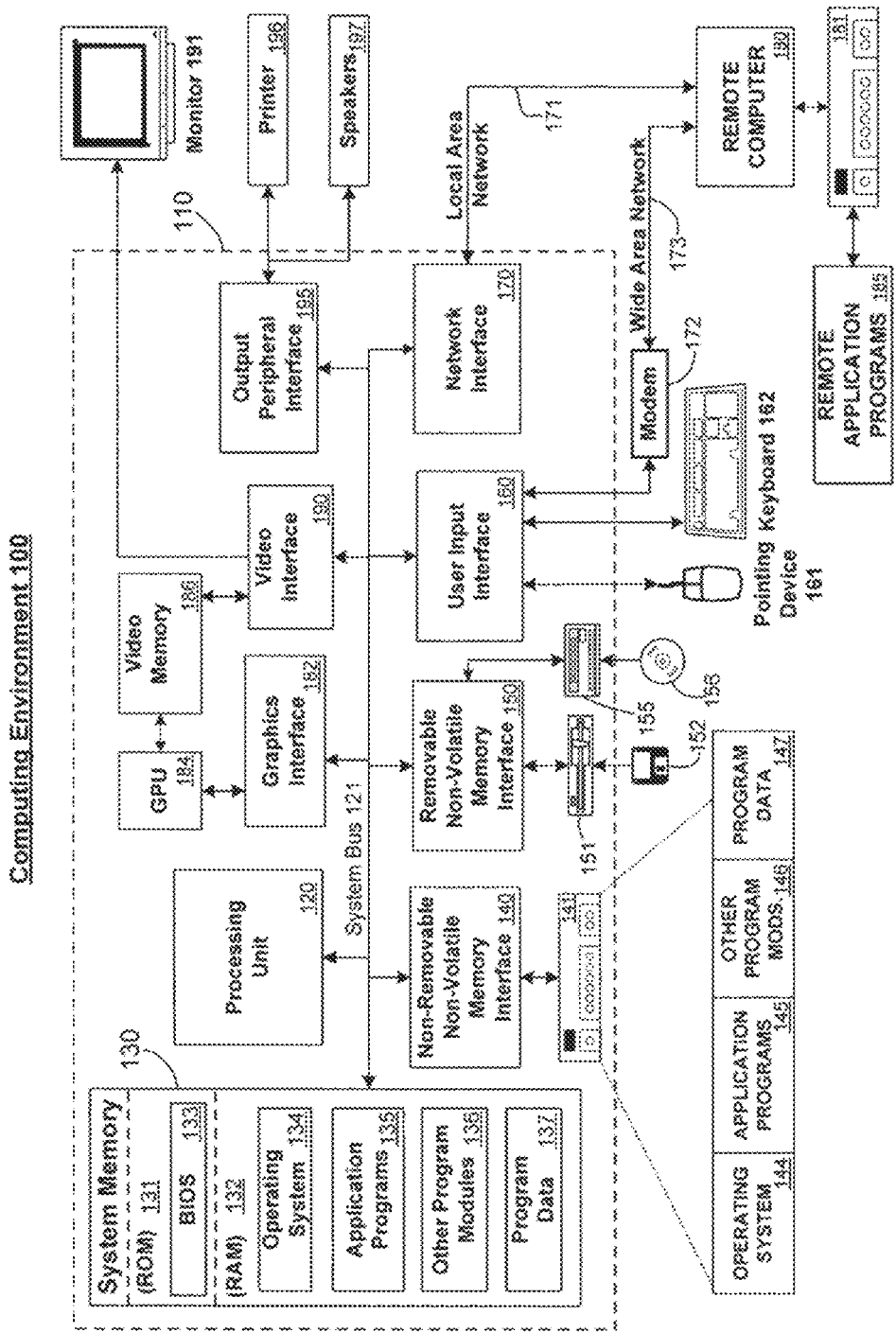
FIG. 1 is a block diagram showing an exemplary computing environment in which aspects of the present invention may be implemented.

The present disclosure will now be described more fully with reference to the figures in which an embodiment of the present disclosure is shown. The subject matter of this disclosure may, however, be embodied in many different forms and should not be construed as being limited to the embodiments set forth herein.

The present invention includes an apparatus, system and method for application-specific and customizable semantic similarity measurement combining structured (dictionary and thesaurus) and corpus-based semantic techniques using data from both a default structured lexical knowledge base and document corpus; and additional structured lexical knowledge bases and document corpora.

In preferred embodiments the invention includes of the following components:

I. Semantic Mapping Component
II. Broad-Coverage Lexical Components
III. Custom Lexical Components
IV. Semantic Corpus Development Tools
V. Lexical Knowledge Base Development Tools Each of the preferred embodiment components are described below.

I. Semantic Mapping Component

The semantic mapping component includes the following elements:

configuration
mapping and category data
   variant-to-normative mapping
   normative-to-metadata mapping
   category storage, retrieval and filtering
Maintenance components
Processing components
   similarity computation
     string similarity
     semantic similarity
       k-nearest-neighbor similarity The semantic mapping component is designed for applications that involve keyword, key phrase and question matching, however can be used for any application that needs to store normative keys and their variants along with optional metadata and category attributes.

The semantic mapping component stores and retrieves semantic mappings. Semantic mappings are relations between a normative form and its associated metadata. Each mapping consists of the following information:

variant form
frequency of variant form
normative form
metadata
category attributes The normative form is the unique, unambiguous representation of a concept. For instance, the normative for U.S. President Barack Obama might be 'President Barack Hussein Obama'.

The variant form is one of many possible ways that the normative form may appear. For instance, the normative 'President Barack Hussein Obama' might have the following variants:

President Barack Hussein Obama
President Obama
Barack Obama
Obama
The President of the United States
The President The frequency of the normative form is the frequency with which this form of the normative occurs with the given combination of normative form, metadata and category attribute.

The metadata is arbitrary, usually application-specific information associated with the given combination of variant form, normative form and category attribute.

Category attributes are labels used to identify distinguishing properties of the given combination of variant form, normative form and metadata. Category attributes can be used to organize mappings; and to provide a way to filter or select mappings in an application. The categories may also have their own structure (e.g., hierarchy) that can be incorporated as category attributes.

By organizing entries in this fashion, each variant of that normative has potentially different frequencies, cargoes and categories.

A common use of the semantic mapping component is to relate the variant inflectional and derivational forms of a term in a lexical knowledge base to its baseform and the associated metadata and category attributes associated with the combination of variant form and normative form. It can also be used to relate one or more variant forms of a given normative question to answer(s) associated with that normative question.

For instance, the normative medical question "What causes gall stones?" might have a number of variant forms (each with their own frequency of occurrence):

"What causes gall stones?"
"How are gall stones formed?"
"How do gall stones develop?"
"gall stones"
"cholelithiasis"

with the following associated answer:

"Gallstones form when substances in bile harden."
and the following associated categories:
"Digestive System"
"Disorder"
"Cholelithiasis"

Matching is done by finding the similarity between an input expression and the variant expressions stored in the semantic mapping component. Similarity is computed in one of four ways:

(a) string similarity: spectral weighted character n-gram similarity with optional stopword removal; similarity is scored using an overlap score such as Jaccard, cosine or correlation distance;

(b) semantic similarity: word- and phrase-based semantic similarity with optional stopword removal; vector space (distributional) model of semantic similarity; term similarity is scored using an overlap score such as cosine or correlation distance; term pairs have pointwise mutual information (PMI) weights;

(c) combined semantic and string similarity: rank returns by a combination of semantic and string similarity; for words found in the lexical resources, use semantic similarity; for words not found, use string similarity;

(d) k-nearest-neighbor similarity: rank returns by the similarity score (using one of the previous three alternatives) of the highest scoring k variants.

The preferred embodiment of the semantic mapping component is the Information Extraction Systems Keyword Matcher.

II. Broad-Coverage Lexical Components

There are two generic lexical components: a broad-coverage lexical knowledge base and a broad-coverage corpus. The broad-coverage structured lexical knowledge base is used to construct a broad-coverage "gloss corpus" in the fashion of Patwardhan and Pedersen. A gloss corpus consists of the set of definitions and examples for each term in the broad-coverage structured lexical knowledge base.

A broad-coverage structured lexical knowledge base is a dictionary or thesaurus that has glosses (short definitions) for terms.

A vector space model is constructed using the glosses from the structured lexical knowledge base represented as a text corpus.

The contexts of each term in each gloss are recorded and counted. These generate the "first-order" semantic vectors for these terms.

"Second-order" semantic vectors are then constructed by creating "extended" or augmented contexts from the glosses for each term and the glosses of all terms that are immediately related to the given term by a specified set of semantic relations. For example, in the WordNet 3.1 thesaurus, these related terms are synonyms, hypernyms/hyponyms, holonyms/meronyms, see also terms, similar terms, derivations, and pertainyms).

A synonym is a term that describes what is semantically equivalent to what is described by a given term (e.g., "doctor" and "physician").

A hypernym is a term that describes what is a broader type than what is described by a given term (e.g., "dog" is the hypernym of "puppy"; and "puppy" is the hyponym of "dog").

A holonym is a term that describes a whole that contains what is described by a given term (e.g., "staircase" is a holonym of "tread"; and "tread" is a meronym of "staircase").

A pertainym is a term that "pertains to" what is described by a given term (e.g., "diabetic" is a pertainym of "diabetes").

The seed (initial) gloss and the glosses of all immediately related terms are concatenated to produce a single lexical context.

The first-order semantic vectors of all of these terms are summed to produce a second-order semantic vector.

Once all second-order vectors have been constructed, the weights of individual cells are computed using a positive pointwise mutual information score. Similarity between terms is measured as the cosine or correlation distance between the second-order vectors of the terms. The result is a vector space model of the broad-coverage structured lexical knowledge base.

This vector space model may then be filtered by frequency and column variance to remove low-frequency terms and contextual terms that provide weak evidence for distinguishing terms semantically.

If a broad-coverage document corpus is available, it is used to supplement the gloss corpus described above to create first-order semantic vectors. A scaling factor is then applied to the weights computed for the terms in the gloss vector corpus to ensure that the contributions of the gloss corpus and document corpus are commensurate. Usually the gloss corpus is "oversampled" by multiplying its weights by a factor greater than 1.0. This factor is determined empirically.

The resulting filtered vector space model may then be used to compute semantic similarity in an application.

The preferred embodiment of the broad-coverage structured lexical knowledge bases uses the Information Extraction Systems Knowledge Base software.

The preferred embodiment of the broad-coverage vector space model uses the Information Extraction Systems Vector Space Modeler.

The preferred embodiment of the production version of the broad-coverage second-order semantic vectors uses the Information Extraction Systems Random Indexer.

There are two very different workflows involved in creating broad-coverage lexical components. The first involves the broad-coverage corpus; the second involves the broad-coverage structured lexical knowledge base.

The broad-coverage corpus is a set of documents that augments the gloss corpus. This corpus is a large collection of documents representative of the language of the application such as news or newspaper articles that cover a wide range of topics. The corpus might also be statistical information about the given language computed from such a document collections such as the Google Books n-gram language data which can be converted into a vector space model.

The first steps in processing the broad-coverage corpus involve converting it into a format that can be used for construction of a vector space model:

selecting a corpus broadly representative of the given language;

converting the documents into the corpus into the appropriate character set;

removing XML and HTML markup or other similar structural metadata, which should not be considered relevant to the semantic content of the text;

converting XML and HTML entities and performing other such normalizations so that the lexicographic form of the text used to compute the vector space model matches the form of anticipated inputs;

splitting documents into smaller text fragments such as sentences.

Next the broad-coverage corpus is converted into a vector space model. A specification is created for the tokenization, filtering and normalization steps in creating a vector space model; as well as for the type of vector space model and window size and direction.

Tokenization is the process of converting a text into its component words and phrases.

Filtering is the process of excluding user-defined words or phrases ("stopwords"); stopwords may be defined by lists or attributes of tokens. Normalization is the process of manipulating or transforming words or phrases into other forms. Normalization tasks include but are not restricted to capitalization folding, stemming or morphological baseforming, and conversion of numbers to a single generic number term.

Normalization may also include the generation or use of other information (such as part-of-speech, syntactic and semantic labels) and the decoration of entries in the vector space model with these labels. The vector space model type determines what entries are included in the vector space model. The types of vector space models include but are not restricted to combinations of terms, documents, categories and decorated terms (for instance, term-by-term, term-by-document, term-by-decorated-term, and so forth).

The window size specification determines how far away a given term from the focus term is allowed to be counted as co-occurrent. The window direction specifies whether or not co-occurrences should be recorded by the direction in which they are found from the focal term (before or after). For example, a term-by-term co-occurrence model within a non-directional window of +/−2 will count all terms up to 2 before and 2 after the focus term. A non-directional document window will count all terms found in the document as co-occurring. A document window is used to generate the vector space model for a broad-coverage corpus.

The frequency counts of all co-occurring terms computed in this way produces the first-order vector space model for the broad-coverage corpus.

The first steps in processing the structured lexical knowledge base involve converting it into formats that are used for the construction of the vector space model:

selecting an appropriate structured lexical knowledge base;

converting the entries into object-attribute-value (OAV) triplets; the OAV triplets capture the semantic relation among entries in the lexical knowledge base, including their glosses and examples;

constructing a gloss corpus from the definitions and examples in the knowledge base.

constructing expanded glosses for each keyword in the structured lexical knowledge base that consist of the original definition and examples along with the glosses of all terms immediately connected by a defined set of semantic relations; this produces a very large "context" for each keyword.

Next the gloss corpus is converted into a vector space model. A specification is created for the tokenization, filtering and normalization steps in creating a vector space model; as well as for the type of vector space model and window size and direction. Tokenization is the process of converting a text into its component words and phrases.

Filtering is the process of excluding user-defined words or phrases ("stopwords"); stopwords may be defined by lists or attributes of tokens. Normalization is the process of manipulating or transforming words or phrases into other forms. Normalization tasks include but are not restricted to capitalization folding, stemming or morphological baseforming, and conversion of numbers to a single generic number term. Normalization may also include the generation or use of other information (such as part-of-speech, syntactic and semantic labels) and the decoration of entries in the vector space model with these labels. The vector space model type determines what entries are included in the vector space model. The types of vector space models include but are not restricted to combinations of terms, documents, categories and decorated terms (for instance, term-by-term, term-by-document, term-by-decorated-term, and so forth).

The window size specification determines how far away a given term from the focus term is allowed to be counted as co-occurrent. The window direction specifies whether or not co-occurrences should be recorded by the direction in which they are found from the focal term (before or after). For example, a term-by-term co-occurrence model within a non-directional window of +/−2 will count all terms up to 2 before and 2 after the focus term. A non-directional document window will count all terms found in the document as co-occurring. A document window is used to generate the vector space model for a gloss corpus.

The counts of co-occurring terms in the gloss corpus are weighted by a scaling factor so that they are appropriately "oversampled" in relation to the broad-coverage corpus.

The frequency counts of all co-occurring terms from the gloss corpus are now combined with the broad-coverage corpus first-order vector space model. This produces the first-order vector space model for the combined broad-coverage corpus and gloss corpus.

As the last step, "second-order" semantic vectors are generated for each keyword in the lexical knowledge base. The second-order semantic vectors are computed by summing the first-order vectors for each term found in the expanded gloss for that term.

This produces a much denser semantic vector than the first-order semantic vector for that term.

The second-order vectors are then provided with weights. The preferred embodiment of these weights are positive pointwise mutual information scores.

III. Custom Lexical Components

The custom lexical components include the custom structured lexical knowledge base and a custom corpus.

The custom lexical components are used to customize the broad-coverage semantic data. The customization process is performed in two ways:

(a) by using an application-specific corpus to generate first-order semantic vectors to supplement the gloss corpus as described for the broad-coverage document corpus; and (b) by adding terms and phrases not found in the broad-coverage lexical resources; adding semantic relations among the combined terms and phrases of both the broad-coverage and custom lexical components; and optionally creating glosses for the added custom terms and phrases.

The custom second-order semantic vectors are computed using the customized first-order semantic vectors; and customized lexical knowledge base. These customized second-order semantic vectors differ from the broad-coverage second-order semantic vectors in two ways: there are new terms and phrases with second-order semantic vectors; and the broad-coverage second-order semantic vectors now include contexts that are application-specific.

The resulting vector space model may now be filtered by frequency and column variance to remove low-frequency terms and contextual terms that provide weak evidence for distinguishing terms.

The resulting filtered vector space model is then used to compute semantic similarity in an application.

The preferred embodiment of the custom structured lexical knowledge base uses the Information Extraction Systems Knowledge Base.

The preferred embodiment of the custom vector space model uses the Information Extraction Systems Vector Space Modeler.

The preferred embodiment of the custom second-order semantic vectors uses the Information Extraction Systems Random Indexer.

Making Custom Lexical Components

There are two very different workflows involved in creating custom lexical components. The first involves the custom corpus; the second involves the custom structured lexical knowledge base.

Custom Corpus

The custom corpus (corpora) is a set of documents that augments the broad-coverage corpus. This corpus is a large collection of documents representative of the topics of the application such as user or technical documentation or technical articles that cover application-specific topics.

The first steps in processing the custom corpus involve converting it into a format that can be used for construction of a vector space model:

converting the documents into the corpus into the appropriate character set;

removing XML and HTML markup or other similar structural metadata, which should not be considered relevant to the semantic content of the text;

converting XML and HTML entities and performing other such normalizations so that the lexicographic form of the text used to compute the vector space model matches the form of anticipated inputs;

splitting documents into smaller text fragments such as sentences.

Next the custom corpus is converted into a vector space model. A specification is created for the tokenization, filtering and normalization steps in creating a vector space model; as well as for the type of vector space model and window size and direction. Tokenization is the process of converting a text into its component words and phrases.

Filtering is the process of excluding user-defined words or phrases ("stopwords"); stopwords may be defined by lists or attributes of tokens. Normalization is the process of manipulating or transforming words or phrases into other forms. Normalization tasks include but are not restricted to capitalization folding, stemming or morphological baseforming, and conversion of numbers to a single generic number term. Normalization may also include the generation or use of other information (such as part-of-speech, syntactic and semantic labels) and the decoration of entries in the vector space model with these labels. The vector space model type determines what entries are included in the vector space model. The types of vector space models include but are not restricted to combinations of terms, documents, categories and decorated terms (for instance, term-by-term, term-by-document, term-by-decorated-term, and so forth).

The window size specification determines how far away a given term from the focus term is allowed to be counted as co-occurrent. The window direction specifies whether or not co-occurrences should be recorded by the direction in which they are found from the focal term (before or after). For example, a term-by-term co-occurrence model within a non-directional window of +/−2 will count all terms up to 2 before and 2 after the focus term. A non-directional document window will count all terms found in the document as co-occurring. A document window is used to generate the vector space model for a custom corpus.

The counts of co-occurring terms in the custom corpus are weighted by a scaling factor so that they are appropriately "oversampled" in relation to the broad coverage corpus.

The frequency counts of all co-occurring terms from the gloss corpus are now combined with the broad-coverage corpus first-order vector space model. This produces the first-order vector space model for the combined broad-coverage corpus and custom corpus.

Custom Structured Lexical Knowledge Base

If the custom structured lexical knowledge base is dictionary or thesaurus with glosses, then it is processed in a manner very similar to a broad-coverage structured lexical knowledge base.

The first steps in processing the custom structured lexical knowledge base involve converting it into formats that are used for the construction of the vector space model:

converting the entries into object-attribute-value (OAV) triplets; the OAV triplets capture the semantic relation among entries in the lexical knowledge base, including their glosses and examples;

constructing a gloss corpus from the definitions and examples in the knowledge base.

constructing expanded glosses for each keyword in the structured lexical knowledge base that consist of the original definition and examples along with the glosses of all terms immediately connected by a defined set of semantic relations; this produces a very large "context" for each keyword.

Next the gloss corpus is converted into a vector space model. A specification is created for the tokenization, filtering and normalization steps in creating a vector space model; as well as for the type of vector space model and window size and direction. Tokenization is the process of converting a text into its component words and phrases.

Filtering is the process of excluding user-defined words or phrases ("stopwords"); stopwords may be defined by lists or attributes of tokens. Normalization is the process of manipulating or transforming words or phrases into other forms. Normalization tasks include but are not restricted to capitalization folding, stemming or morphological baseforming, and conversion of numbers to a single generic number term. Normalization may also include the generation or use of other information (such as part-of-speech, syntactic and semantic labels) and the decoration of entries in the vector space model with these labels. The vector space model type determines what entries are included in the vector space model. The types of vector space models include but are not restricted to combinations of terms, documents, categories and decorated terms (for instance, term-by-term, term-by-document, term-by-decorated-term, and so forth).

The window size specification determines how far away a given term from the focus term is allowed to be counted as co-occurrent. The window direction specifies whether or not co-occurrences should be recorded by the direction in which they are found from the focal term (before or after). For example, a term-by-term co-occurrence model within a non-directional window of +/−2 will count all terms up to 2 before and 2 after the focus term. A non-directional document window will count all terms found in the document as co-occurring. A document window is used to generate the vector space model for a gloss corpus.

The counts of co-occurring terms in the custom gloss corpus are weighted by a scaling factor so that they are appropriately "oversampled" in relation to the broad coverage corpus and structured knowledge base.

The frequency counts of all co-occurring terms from the custom gloss corpus are now combined with the broad-coverage first-order vector space model. This produces the first-order vector space model for the combined broad-coverage and custom corpus.

As the last step, "second-order" semantic vectors are generated for each keyword in the lexical knowledge base. The second-order semantic vectors are computed by summing the first-order vectors for each term found in the expanded gloss for that term.

This produces a much denser semantic vector than the first-order semantic vector for that term. The second-order vectors are then provided with weights. The preferred embodiment of these weights are positive pointwise mutual information scores.

The second approach to creating a custom structured lexical knowledge base is to modify or augment an existing structured lexical knowledge base. This is done by:

(a) adding new terms and phrases missing from the broad-coverage structured lexical knowledge base;

(b) adding definitions and examples for these new terms and phrases; and (c) adding semantic relations between all terms (broad-coverage and added new terms and phrases).

Consider the example of adding the term "ophthalmologist"; its gloss (e.g., "a specialist in medical and surgical eye problems"); and semantic relations (e.g., synonym="eye doctor"; hypernyms="doctor" and "physician"; pertainym="ophthalmologic"; related="eye"). The custom lexical knowledge base now has a new gloss that can be expanded by glosses for synonyms, hypernyms and hyponyms, pertainyms and related terms. Expanded glosses can also be generated for terms that don't themselves have glosses by using just the expansions of immediately related terms.

There are also tools for editing, maintaining and modify a lexical knowledge base that assist the editor in:

(a) identifying candidate custom terms and phrases;

(b) creating custom OAV triplets that encapsulate semantic relations; and (c) compiling custom structured lexical knowledge bases.

The resulting custom structured lexical knowledge base is processed identically to the broad-coverage lexical knowledge base.

The first steps in processing the custom structured lexical knowledge base involve converting it into formats that are used for the construction of the vector space model:

converting the entries into object-attribute-value (OAV) triplets; the OAV triplets capture the semantic relation among entries in the lexical knowledge base, including their glosses and examples;

constructing a gloss corpus from the definitions and examples in the knowledge base.

constructing expanded glosses for each keyword in the structured lexical knowledge base that consist of the original definition and examples along with the glosses of all terms immediately connected by a defined set of semantic relations; this produces a very large "context" for each keyword.

Next the gloss corpus is converted into a vector space model. A specification is created for the tokenization, filtering and normalization steps in creating a vector space model; as well as for the type of vector space model and window size and direction.

Tokenization is the process of converting a text into its component words and phrases.

Filtering is the process of excluding user-defined words or phrases ("stopwords"); stopwords may be defined by lists or attributes of tokens. Normalization is the process of manipulating or transforming words or phrases into other forms. Normalization tasks include but are not restricted to capitalization folding, stemming or morphological baseforming, and conversion of numbers to a single generic number term. Normalization may also include the generation or use of other information (such as part-of-speech, syntactic and semantic labels) and the decoration of entries in the vector space model with these labels. The vector space model type determines what entries are included in the vector space model. The types of vector space models include but are not restricted to combinations of terms, documents, categories and decorated terms (for instance, term-by-term, term-by-document, term-by-decorated-term, and so forth).

The window size specification determines how far away a given term from the focus term is allowed to be counted as co-occurrent. The window direction specifies whether or not co-occurrences should be recorded by the direction in which they are found from the focal term (before or after). For example, a term-by-term co-occurrence model within a non-directional window of +/−2 will count all terms up to 2 before and 2 after the focus term. A non-directional document window will count all terms found in the document as co-occurring. A document window is used to generate the vector space model for a gloss corpus.

The counts of co-occurring terms in the gloss corpus are weighted by a scaling factor so that they are appropriately "oversampled" in relation to the broad-coverage corpus.

The frequency counts of all co-occurring terms from the gloss corpus are now combined with the custom corpus first-order vector space model. This produces the first-order vector space model for the combined custom corpus and gloss corpus.

As the last step, "second-order" semantic vectors are generated for each keyword in the lexical knowledge base. The second-order semantic vectors are computed by summing the first-order vectors for each term found in the expanded gloss for that term.

This produces a much denser semantic vector than the first-order semantic vector for that term.

The second-order vectors are then provided with weights. The preferred embodiment of these weights are positive pointwise mutual information scores.

IV. Semantic Corpus Development Tools

The semantic corpus development tools are used to generate the first- and second-order semantic vectors and include the following elements:
configuration
model creation
tokenization
normalization
statistics
compilation
maintenance components
extraction
vocabulary statistics
clustering components The process of creating first-order semantic vectors is performed in the following steps:
(a) specify a document collection (corpus) to be used for generating vectors;
(b) specify whether or not the entries to be processed are decorated by attribute labels (such as part of speech, syntactic relation or named entity);
(c) specify the type of vector space model that is to be computed (e.g., term by term, document by term, term+part-of-speech by term+part-of-speech, and so forth);
(d) specify how tokenization and normalization are to be performed:
  (i) capitalization case folding (converting to lowercase);
  (ii) stopwords filtering (removing stopwords);
  (iii) number folding (treating as a single <num> token);
  (iv) stemming or baseforming (Porter stemming or reducing to morphological baseform);
(e) specify the size of the lexical context ("window") used to generate associations (number of tokens before and after the focus token; or a larger context such as sentence, paragraph or entire document);
(f) specify whether or not order and position are recorded in the semantic vector;

The corpus is then analyzed and co-occurrence statistics generated using this specification.

All co-occurrence statistics are recorded for each cell in the vector space model.

Finally, weights are generated for all non-zero cells in the vector space model. The preferred implementation weighting technique is to compute the positive pointwise mutual information for each cell.

The vector space model may then be filtered by frequency and column variance to remove low-frequency terms and contextual terms that provide little information to distinguishing terms.

The resulting filtered vector space model is then converted into an application.

The preferred embodiment of the vector space model uses the Information Extraction Systems Vector Space Modeler.

The preferred embodiment of the second-order semantic vectors uses the Information Extraction Systems Random Indexer.

Software utilities for finding candidate terms for customizing structured lexical knowledge bases are included, for:
  (a) generation of term and phrase frequency lists;
  (b) phrase generation using mutual information metrics;
  (c) comparison of term and phrase frequency lists and authority lists of terms and phrases in a structured lexical knowledge base;
  (d) semantic distance measurement of terms and phrases;
  (e) semantic clustering of terms and phrases.

V. Lexical Knowledge Base Development Tools

The lexical knowledge bases development tools are used to construct and process a knowledge base as represented by object-attribute-value (OAV) triplets configuration and include the following elements:
creation
editing semantic relations
editing glosses
compilation
maintenance components Many lexical knowledge base development tasks require no special tools. For instance, editing the knowledge base configuration file, and creating semantic relations and glosses can be done using a standard programming editor.

However, special software tools are included to (a) validate the configuration, semantic relation and gloss data files; (b) compile the lexical knowledge base; and (c) produce reports on errors and changes to the lexical knowledge base.

The preferred embodiment of the software tools is a combination of jython scripts and Java libraries for the Information Extraction Systems Knowledge Base.

The preferred embodiment of the structured lexical knowledge base is the Information Extraction Systems Knowledge Base.

An Exemplary Operating Environment

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations.

Examples of well-known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1a illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The overall system components are presented in FIG. 2a. The overall system consists of three components: the semantic mapping and vector model development tools component (1000); the semantic mapping and vector model data component (1100); and the semantic similarity component (1200).

Development Tools

Figure 2B:
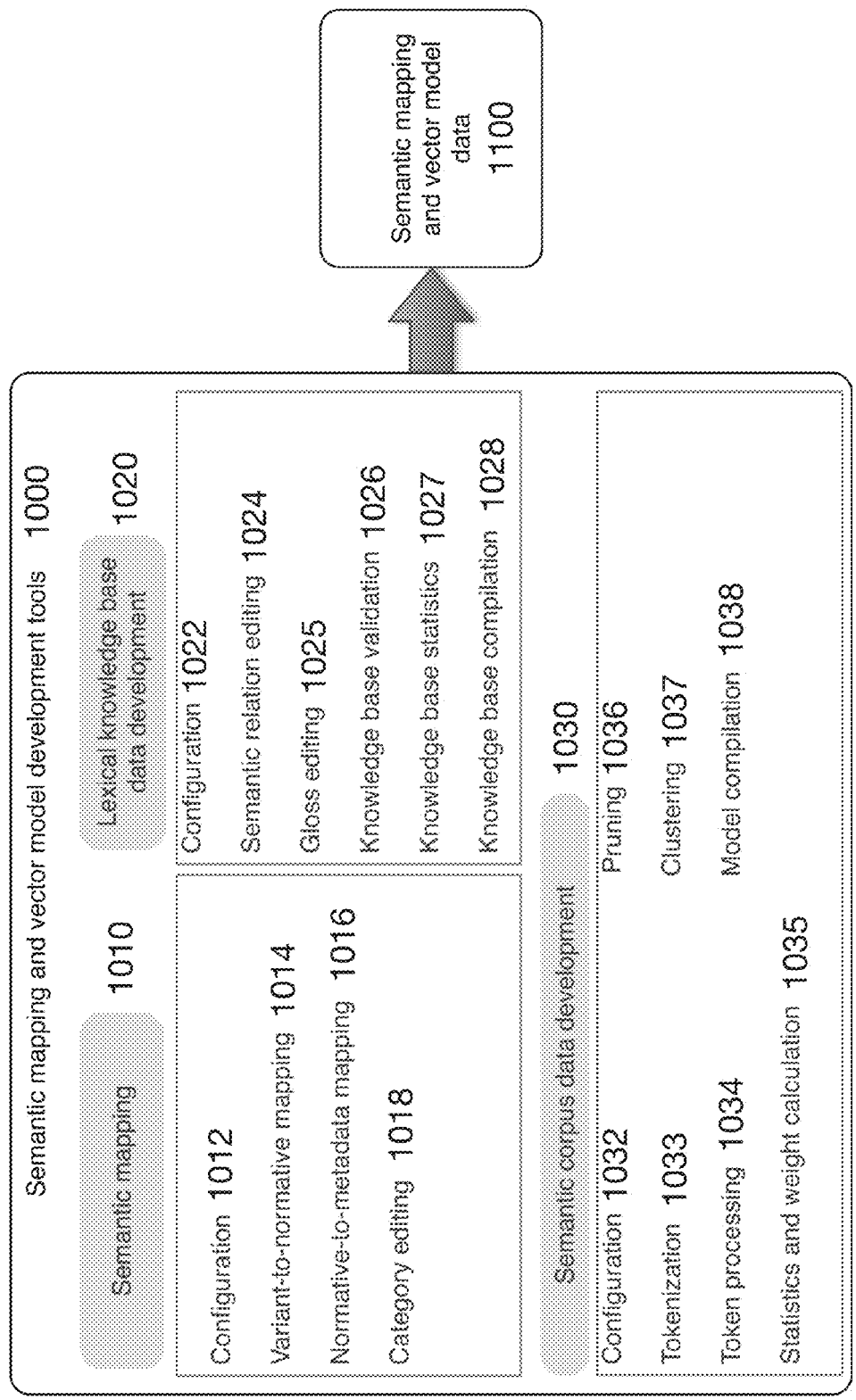
FIG. 2b shows semantic mapping and vector model development tools component according to one embodiment of the invention.

The details of the semantic mapping and vector model development tools component (1000) are presented in FIG. 2b. These tools are used to develop, maintain and modify the semantic mapping and vector model data component (1100). The tools are divided into three groups: the semantic mapping component (1010); the lexical knowledge base data development tools (1020); and the semantic corpus data development tools (1030).

The semantic mapping tools consist of a configuration (1012) that controls the behavior of the semantic mapping tools; a variant-to-normative mapping tool (1014) that assigns variant forms to their normative or canonical representation; the normative-to-metadata mapping tool (1016) that assigns arbitrary metadata—for instance, frequency of occurrence, informative label or task specification—to a normative or canonical representation; and the category editing tool (1018) that assigns one or more categories to the combination of variant form, normative form and metadata.

The lexical knowledge base data development tools consist of a configuration (1022) that controls the behavior of the lexical knowledge base data development tools; semantic relation editing tools (1024); gloss editing tools (1025); knowledge base validation tools (1026); knowledge base statistics tools (1027); and knowledge base compilation tools (1028).

The semantic corpus data development tools consist of a configuration (1032) that controls the behavior of the semantic corpus development tools; tokenization tools (1033); token processing tools (1034); statistics and weight calculation tools (1035); pruning tools (1036); clustering tools (1037); and model compilation tools (1038).

Models (Data)

Figure 2C:
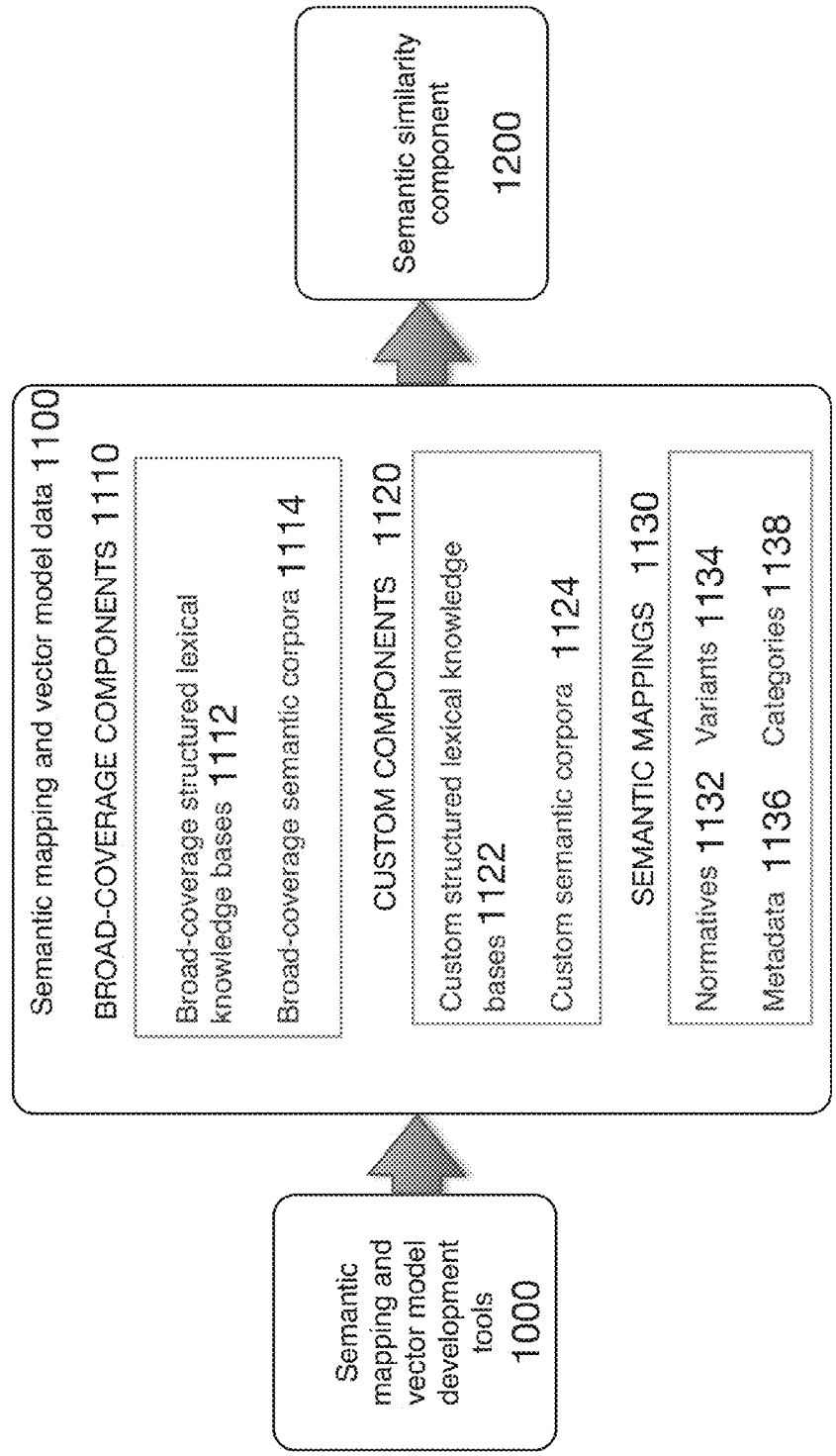
FIG. 2c shows semantic mapping and vector model data according to one embodiment of the present invention.

The semantic mapping and vector model data (1100) that are the output of the semantic mapping and vector model development tools (1000) are presented in FIG. 2c. These data are used by the semantic similarity component (1200) to compute semantic similarity. This component consists of three major classes of data: broad coverage data components (1110); custom data components (1120); and the semantic mappings (1130).

Broad coverage data components are data components that are not specific to any particular topic, domain or application. On the other hand, custom data components are data components have been selected or developed to be specific to a particular topic, domain or application.

There are two types of broad coverage data components: broad coverage structured lexical knowledge bases (1112); and broad coverage semantic corpora (1114). Similarly, there are two types of custom components: custom structured lexical knowledge bases (1122); and custom semantic corpora (1124).

The semantic mappings consist of four components: normatives (1132), the canonical or normative forms of text fragments; variants (1134), alternative or variant forms of text fragments that are mapped to normative forms; metadata (1136), data associated with each mapping; and categories (1138), attributes or labels that are used to organize or filter mappings.

Run-Time System

Figure 2D:
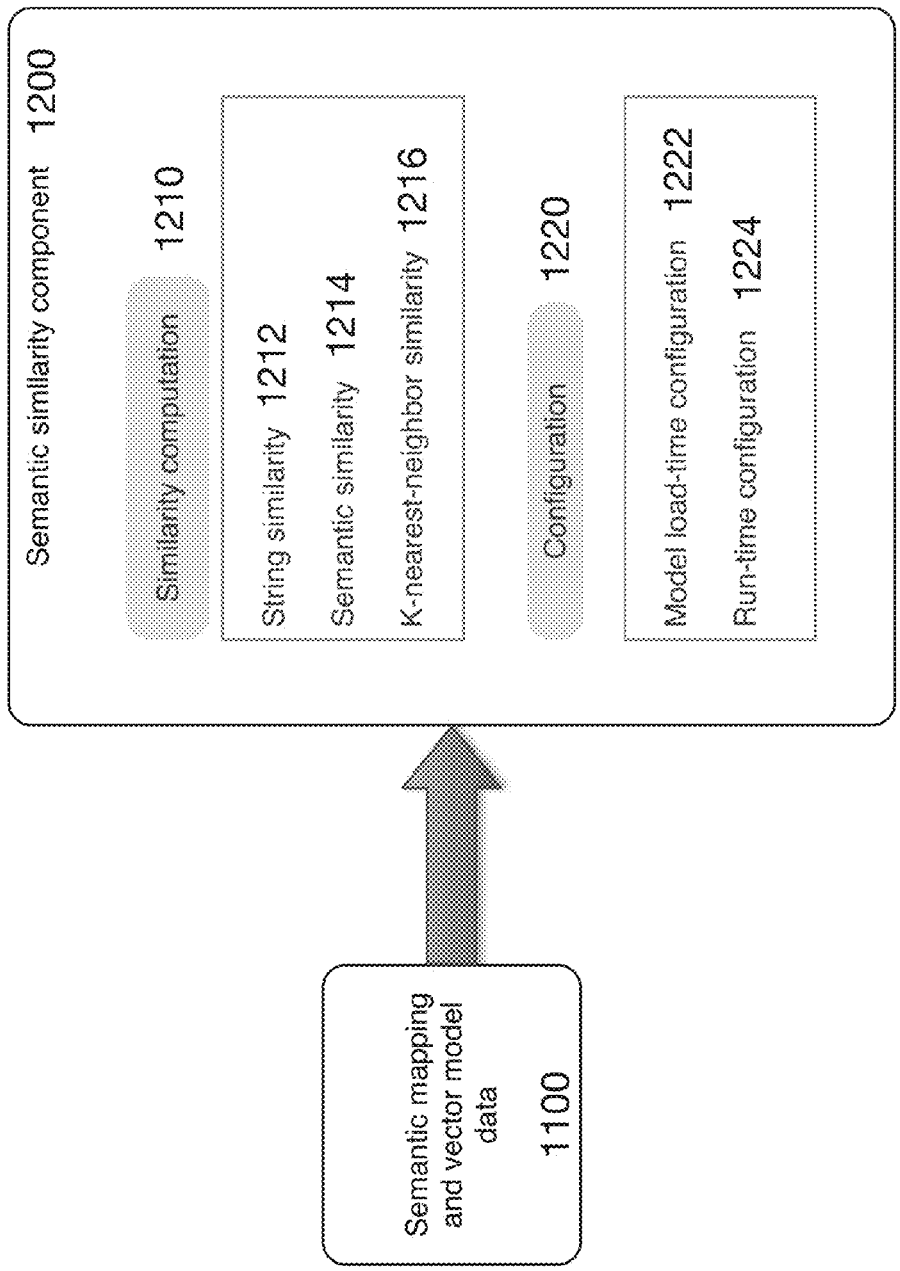
FIG. 2d shows semantic similarity component according to one embodiment of the present invention.

The semantic similarity component (1200) which uses the semantic mapping and vector model data (1100) as described in FIG. 2d. The semantic similarity component computes the semantic similarity of two texts. A text is a word, phrase, sentence, paragraph or longer sequence of words.

The semantic similarity component consists of two parts: similarity computation (1210); and configuration (1220). Similarity computation has three sub-components: string similarity (1212) computation; semantic similarity (1214) computation; and k-nearest neighbor similarity (1216) computation). String similarity determines how similar two texts are based on properties such as words, phrases, substrings consisting of words and characters, and other attributes of the character representation of the texts. Semantic similarity determines how similar two texts are based on semantic similarity information for the words and phrases that make up the texts. Configuration consists of two types: model load-time configuration (1222); and run-time configuration (1224). Model load-time configuration specifies how string, semantic and k-nearest neighbor data are manipulated and loaded for run-time processing. Run-time configuration specifies how text fragment inputs are processed and how semantic similarity is computed.

Model Creation Configuration

Figure 3:
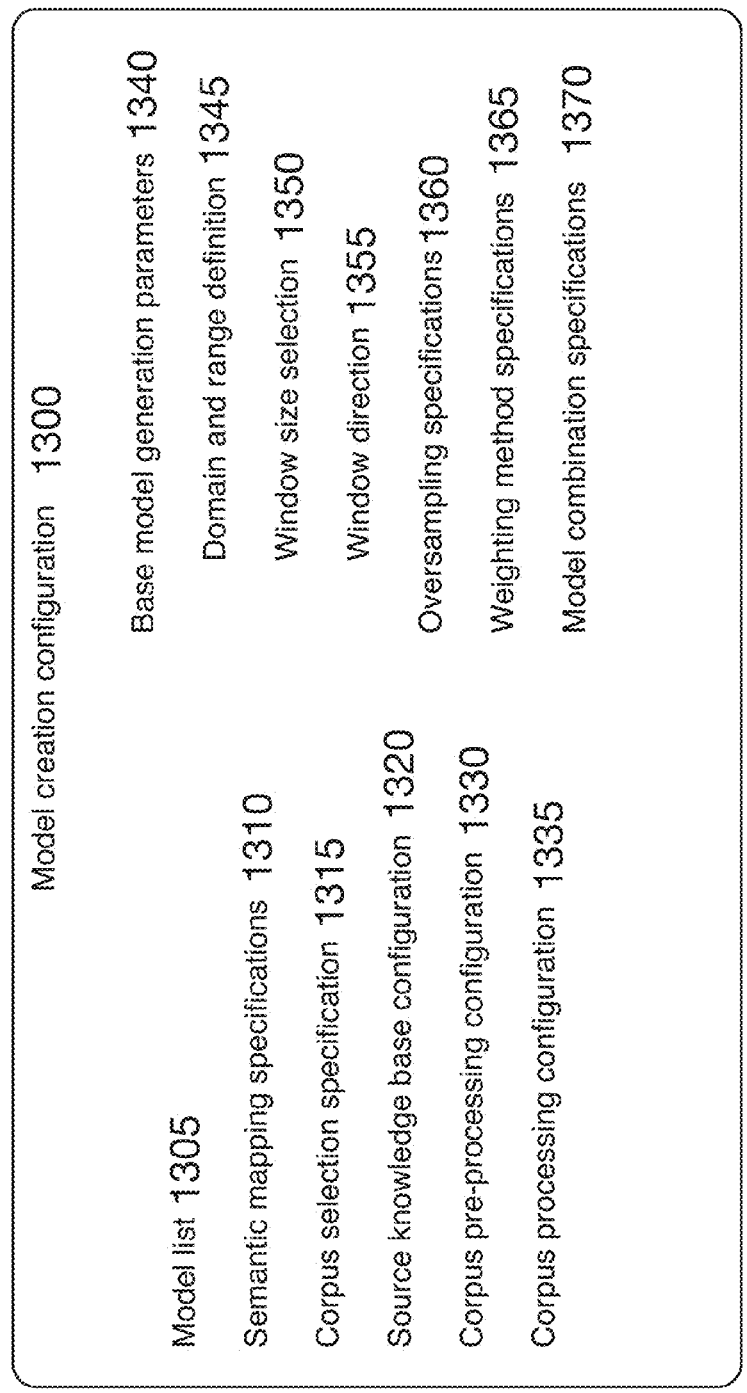
FIG. 3 shows a flow diagram having a model creation configuration according to one embodiment of the present invention.

Model creation configuration (1300) is presented in FIG. 3. Model creation configuration consists of the configurations, parameter settings, selection criteria and specifications used to create semantic models. The set of model creation configuration contains: the model list (1305), the list of models to be generated, maintained and used by the semantic similarity component; the semantic mapping specification (1310), the configuration for creating the semantic mapping used by the semantic similarity component; the corpus selection specification (1315) identifies the documents that make up the corpus to be processed; the source knowledge base configuration (1320) identifies the source knowledge base and the semantic relations used to process a lexical knowledge base; the corpus pre-processing configuration (1330) specifies the processing steps used to prepare a corpus; the corpus processing configuration (1335) specifies the processing steps and parameter values used to process a corpus; the base model generation parameters (1340) specifies the processing steps and parameter values used to generate a base model from a corpus; the domain and range definition (1345) specifies the components and relations among components in the base model; the window size selection (1350) specifies the allowable distance of terms in the corpus used to generate the base model; the window direction (1355) specifies the direction (preceding, following or both) for the window size previously specified; the oversampling specifications (1360) specifies how the weights for two or more base models are combined; the weighting method specifications (1365) determines the weighting method that is used to generate the run-time corpus model; and the model combination specifications (1370) determines how statistics from two or semantic models are combined to compute semantic similarity.

Description of Processing

Preparing a Corpus to Generate a Base Model

Figure 4A:
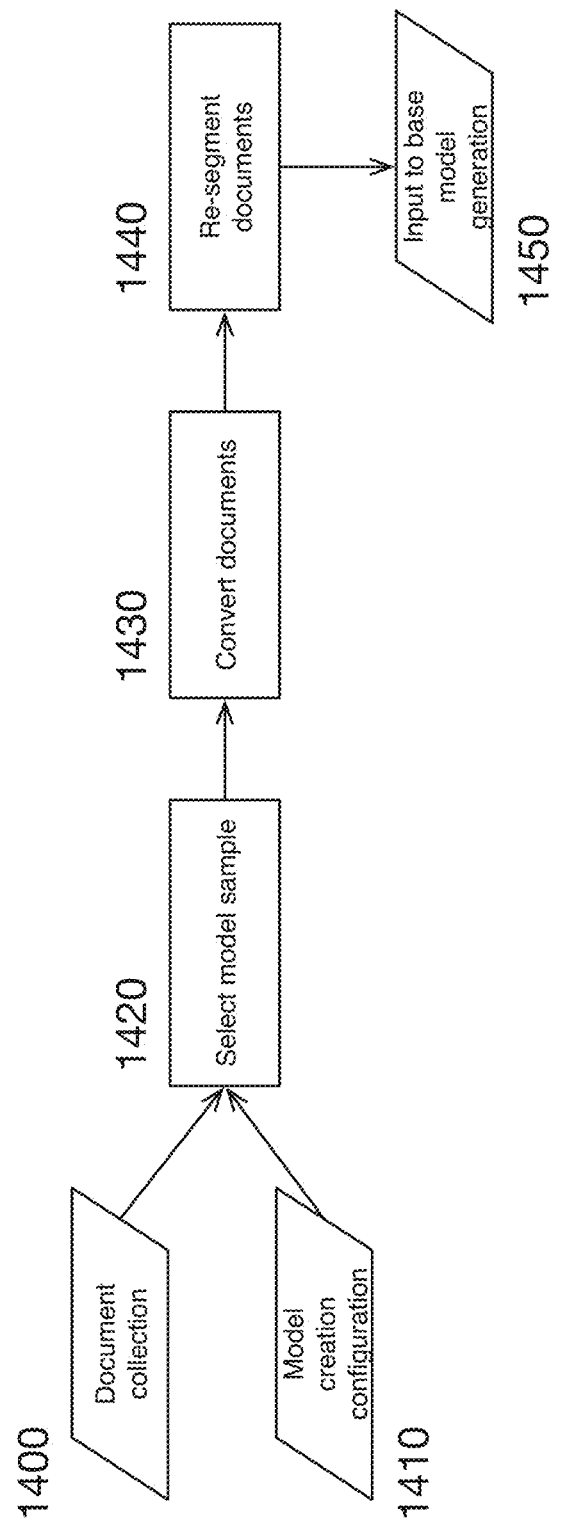
FIG. 4a shows a flow diagram detailing steps in preparing a corpus to prepare input for generating a base model according to one embodiment of the present invention.

The steps in preparing a corpus to generate a base model are presented in FIG. 4*a*. A document collection (or corpus) (1400) and the corresponding model creation configuration (1410) are the two inputs to this process. On their basis, a model sample is selected (1420). The documents in this sample are then converted (1430) into a standard processing form. These standardized documents are then segmented (1440), resulting in the inputs used to generate a base model (1450).

Preparing an HTML Corpus to Generate a Base Model

Figure 4B:
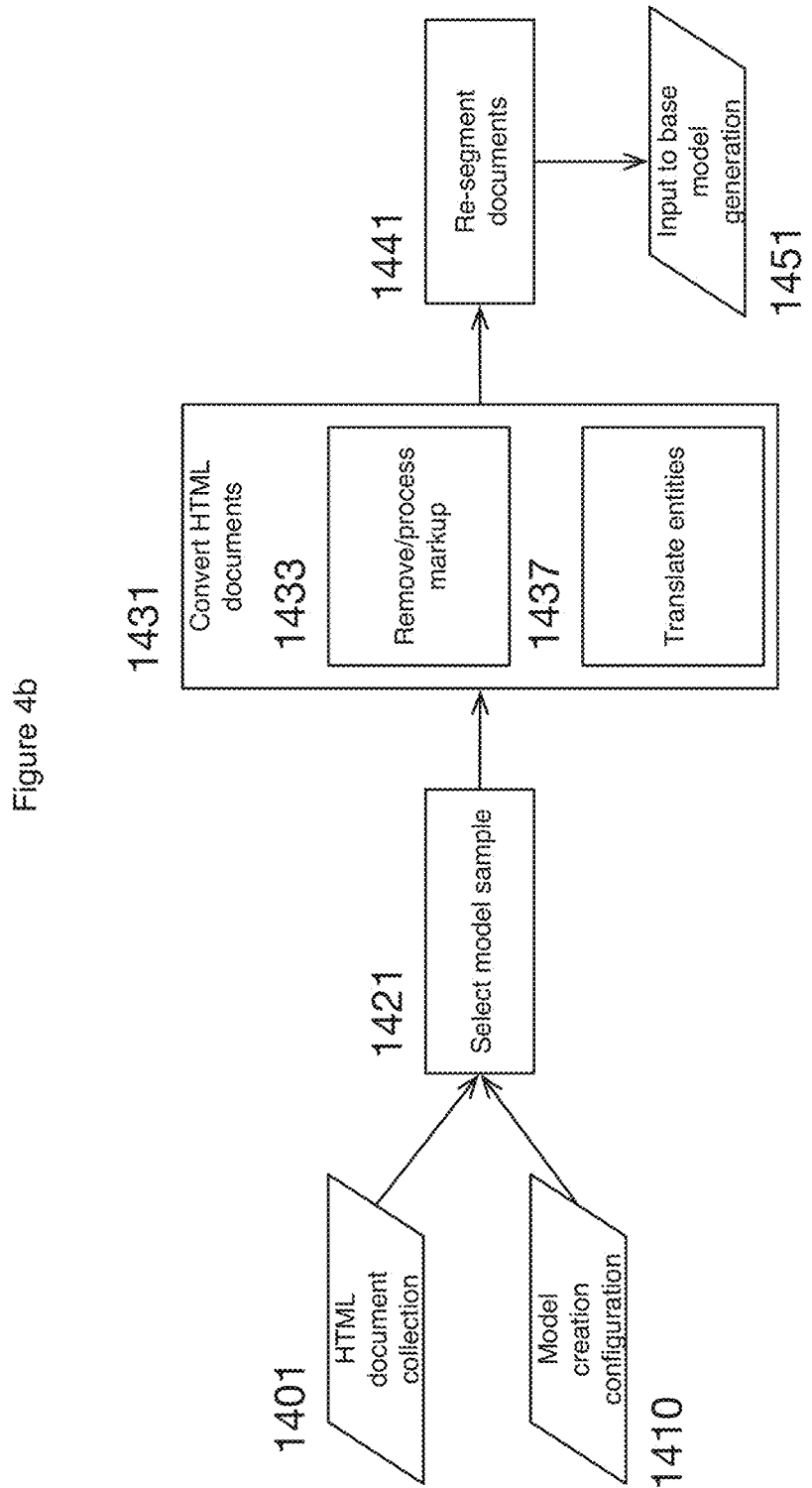
FIG. 4b shows a flow diagram detailing steps in preparing a corpus to prepare input for generating a base model according to one embodiment of the present invention.

A special case of preparing a corpus to generate a base model from a collection of HTML documents is presented in FIG. 4*b*.

A document collection (or corpus) of HTML documents (1401) and the corresponding model creation configuration (1410) are the two inputs to this process. On their basis, a model sample is selected (1421). The HTML documents in this sample are then converted (1431) into a standard processing form. The HTML conversion process consists of two processes: removing or processing HTML markup (1433); and translating HTML entities into characters (1437). These standardized documents are then segmented (1441), resulting in the inputs used to generate a base model (1451).

Preparing the Lexical Knowledge Base to Create a Base Model

Figure 5:
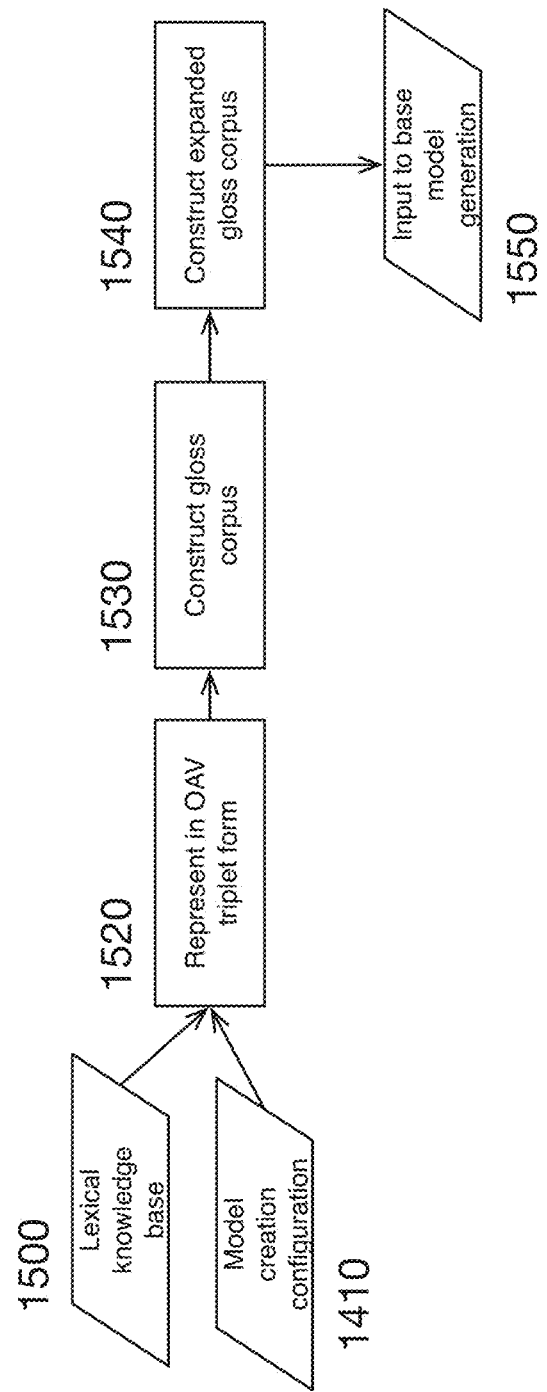
FIG. 5 shows a flow diagram detailing steps in preparing a lexical knowledge base to prepare input for generating a base model according to one embodiment of the present invention.

The steps in preparing a lexical knowledge base to create a base model are presented in FIG. 5. The two inputs to this process are a lexical knowledge base (1500) and a model creation configuration (1410). The lexical knowledge base is converted into object-attribute-value data ("OAV triplets") (1520) based on the model creation configuration.

A gloss corpus (1530) consisting of the definitions ("glosses") of each term in the lexical knowledge base is generated. An expanded gloss corpus is generated incorporating glosses of terms found in relations specified by the model creation configuration (1540). The resulting expanded gloss corpus is now the input for base model generation (1550).

Creating a Base Model from a Corpus of any Type

Figure 6:
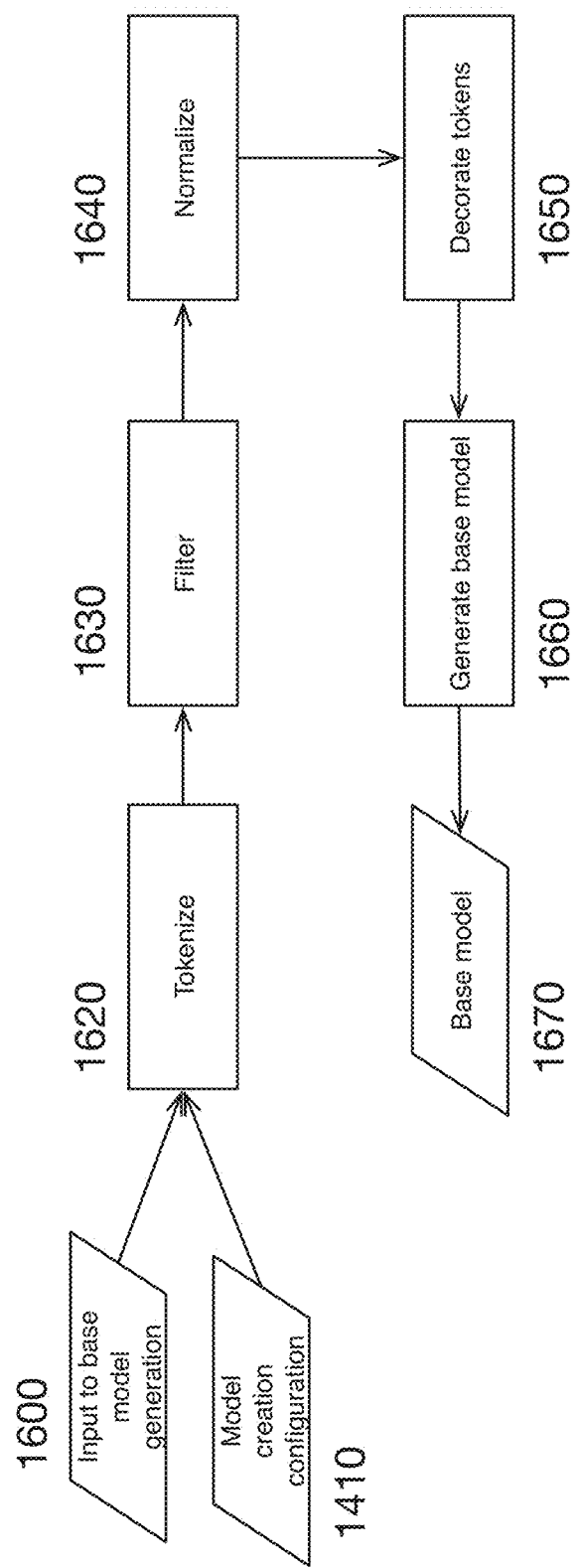
FIG. 6 shows a flow diagram detailing steps in a process of creating a base model from either a structured lexical knowledge base or a corpus according to one embodiment of the present invention.

The process of creating a base model from a corpus of any type is presented in FIG. 6. The two inputs to this process are the input to base model generation (1600) and the model creation configuration (1410). The processes performed are tokenization (1620), the segmentation of text into tokens or elementary lexical units (words and phrases); filtering (1630), the removal (for instance, high-frequency low-information stopwords) or replacement of specified tokens by other tokens (for instance, numbers and contractions); normalization (1640), the transformation of tokens to other forms (for instance, capitalization folding, stemming, and baseforming); and token decoration (1650), appending information (for instance, part-of-speech, syntactic and named entity labels) to tokens. The resulting set of tokens is then used to generate (1660) the output of this entire process, a base model (1670).

Adding Multiple Base Models

Figure 7:
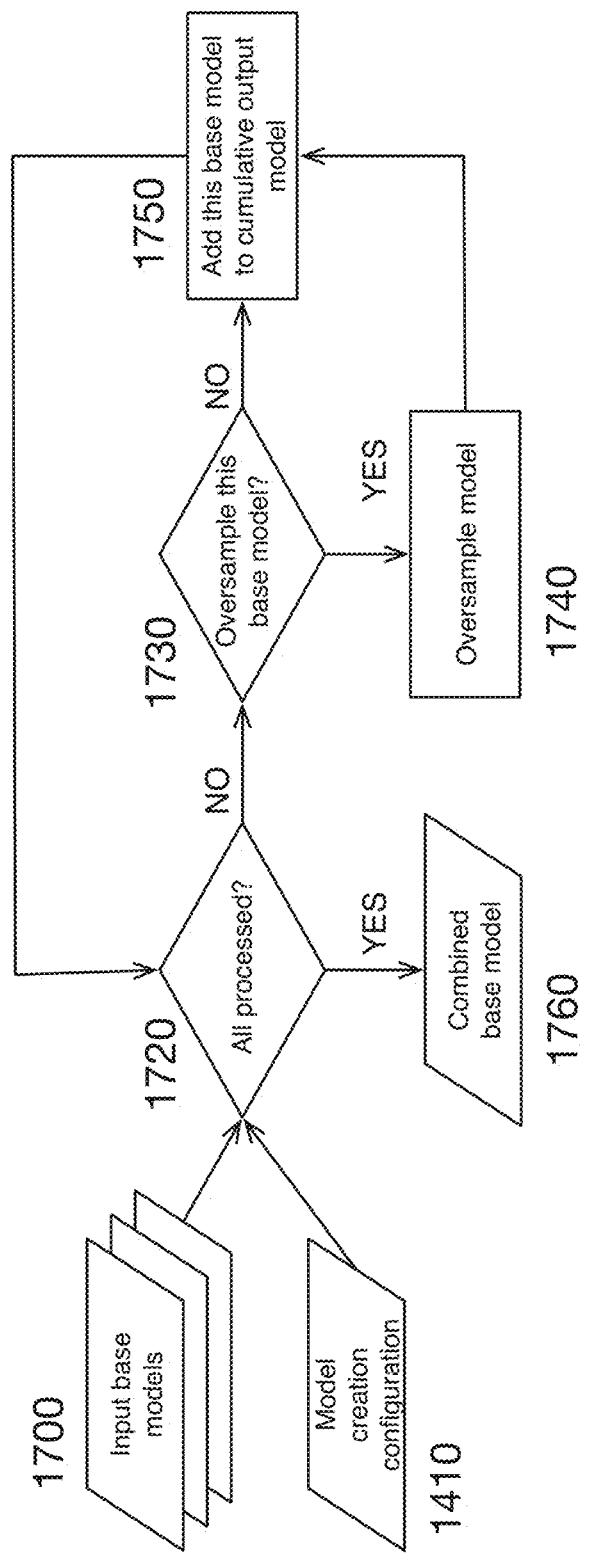
FIG. 7 shows a flow diagram detailing steps in a process of adding multiple base models according to one embodiment of the present invention.

The process of adding multiple base models is presented in FIG. 7. The inputs to this process are two or more input base models (1700) and the model creation configuration (1410). Each of the input models is processed in turn until all models have been processed (1720). If a model has not been processed, it is tested for oversampling (1730). If it is to be oversampled, the model is oversampled by adjusting its statistics (1740) before it is added to the cumulative output model (1750). Otherwise it is added to the cumulative output model unchanged (1750). If all input base models have been processed, the cumulative output model is output as the combined base model (1760).

Generating the Vector Model for Semantic Corpora

Figure 8:
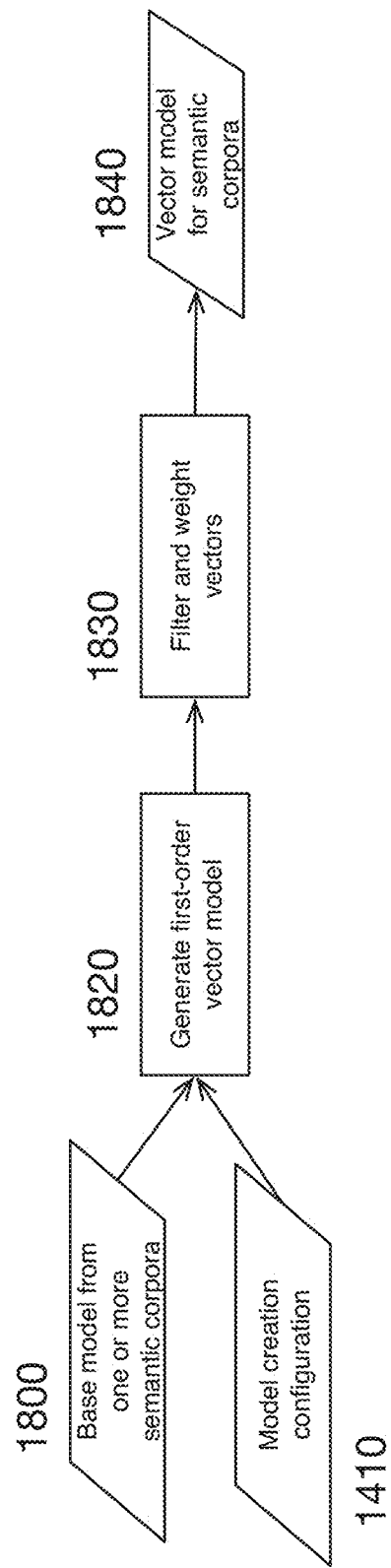
FIG. 8 shows a flow diagram detailing steps in a process of generating the vector model for semantic corpora according to one embodiment of the present invention.

The process of generating the vector model for semantic corpora is presented in FIG. 8. The inputs to this process are the base model from one or more semantic corpora (1800) and the model creation configuration (1410). A semantic corpus is a corpus created from a document collection. A first-order vector model is a vector model created directly from this corpus (1820). Next the first-order vector model has cell entries filtered based on frequency and variance; and the remaining terms weighted according to the model creation configuration (1830). The output of this process is a vector model for the input semantic corpora (1840).

Generating the Vector Model for Lexical Knowledge Bases

Figure 9:
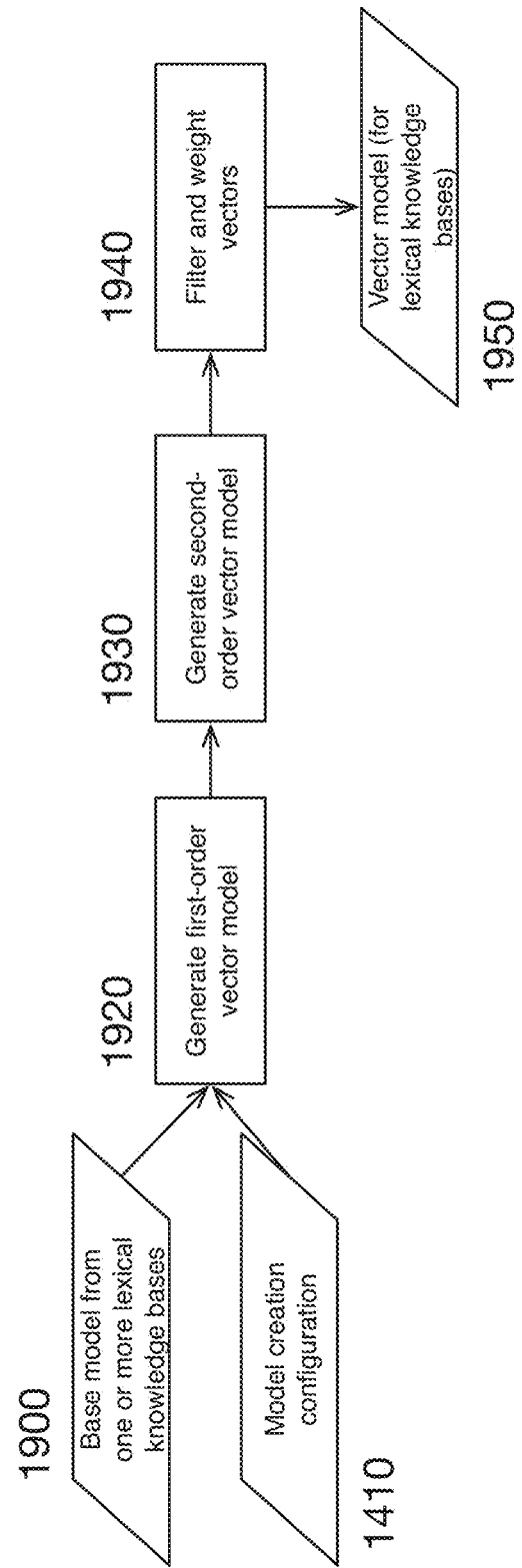
FIG. 9 shows a flow diagram detailing steps in a generating a vector model for lexical knowledge bases according to one embodiment of the present invention.

The process of generating a vector model for lexical knowledge bases is presented in FIG. 9. The inputs to this process are the base model from one or more lexical knowledge bases (1900) and the model creation configuration (1410). A base model from one or lexical knowledge bases is generated from the gloss corpora of these lexical knowledge bases. A first-order vector model is a vector model created directly from this gloss corpus (1920). Next a second-order vector model is generated from the glosses (or expanded glosses) of the lexical knowledge bases. This is done by creating a vector model consisting of a vector for each term that has a gloss (or expanded gloss) as the sum of the first-order vector of each term in the gloss. Next the second-order vector model has cell entries filtered based on frequency and variance; and the remaining terms weighted according to the model creation configuration (1940). The output of this process is a vector model for the lexical knowledge bases (1950).

Developing or Enhancing Lexical Knowledge Bases (Editorial Process)

Figure 10:
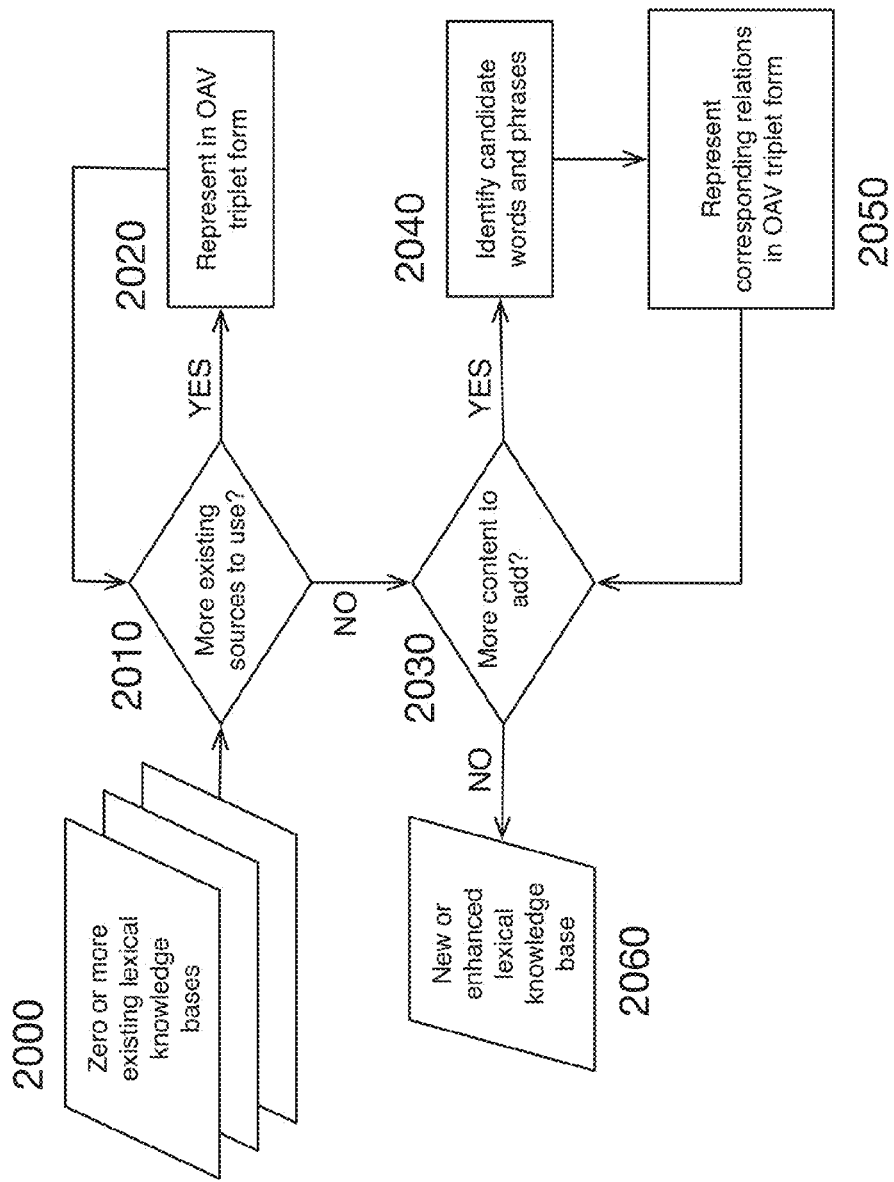
FIG. 10 shows a flow diagram detailing steps in an editorial process of developing or enhancing lexical knowledge bases according to one embodiment of the present invention.

The process of developing or enhancing lexical knowledge bases in an editorial process presented in FIG. 10. This process has zero or more existing lexical knowledge bases as inputs (2000). All input lexical knowledge bases are represented as object-attribute-value data ("OAV triplets") (2020) until there are no more to represent in this fashion (2010).

Once all lexical knowledge bases have been converted in to OAV triplets, candidate words and phrases are identified (2040) and their relations to existing entries are represented as OAV triplets (2050) until no more candidates are available (2030). The output is a new or enhanced lexical knowledge base (2060).

Developing Semantic Mapping Data (Keyword Matcher Data)

Figure 11:
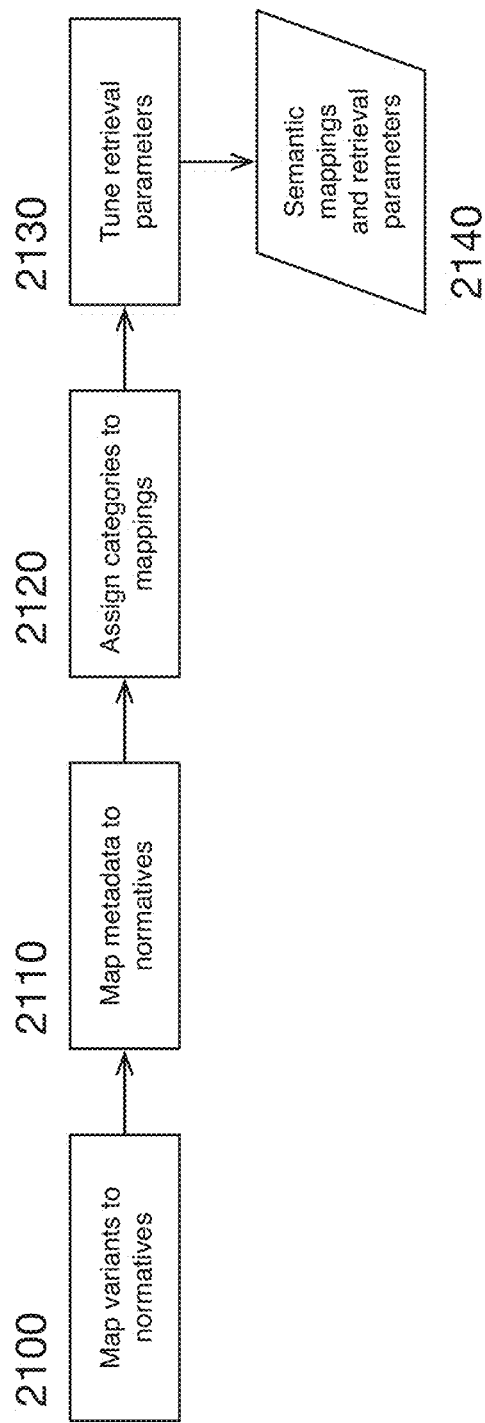
FIG. 11 shows a flow diagram detailing steps in an editorial process of developing semantic mapping data according to one embodiment of the present invention.

The process of developing semantic mapping data (data used by the keyword matcher) is presented in FIG. 11. This process consists of the following sequence of steps: mapping (assigning) variants to normative or canonical forms (2100); mapping (assigning) metadata to normatives (2110); mapping (assigning) zero or more categories to mappings; and finally tuning retrieval parameters for the resulting mapping (2130). The output of this process are semantic mappings and retrieval parameters (2140) used by the keyword matcher.

General Process for Creating Vector Models from Corpora

Figure 12:
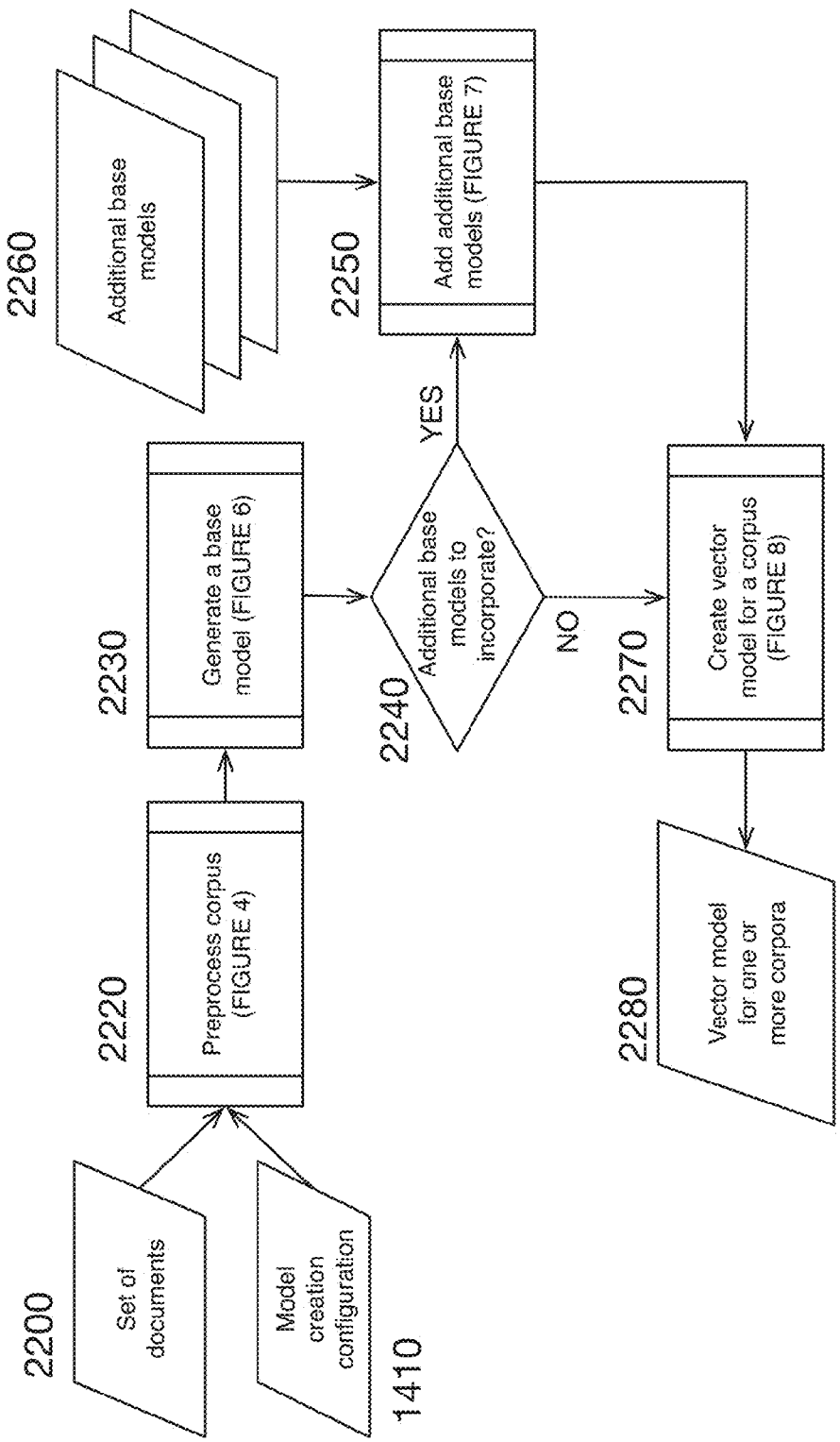
FIG. 12 shows a flow diagram detailing a general process for creating vector models from corpora according to one embodiment of the present invention.

The general process for creating vector models from corpora is presented in FIG. 12.

These inputs to this process are a set of documents ("corpus") (2200) and a model creation configuration (1410).

First, the corpus is preprocessed (2220); this process is described in greater detail in FIG. 4. Next a base model is generated (2230); this process is described in greater detail in FIG. 6. If additional base models are supplied (2260), these are added to the initial base model (2250) until no more additional models remain (2240); the process of adding additional base models is described in greater detail in FIG. 7. Once all additional models have been added, a vector model is created for the corpus (2270); this process is described in greater detail in FIG. 8. The output of this process is a vector model for one or more corpora (2280).

Figure 13:
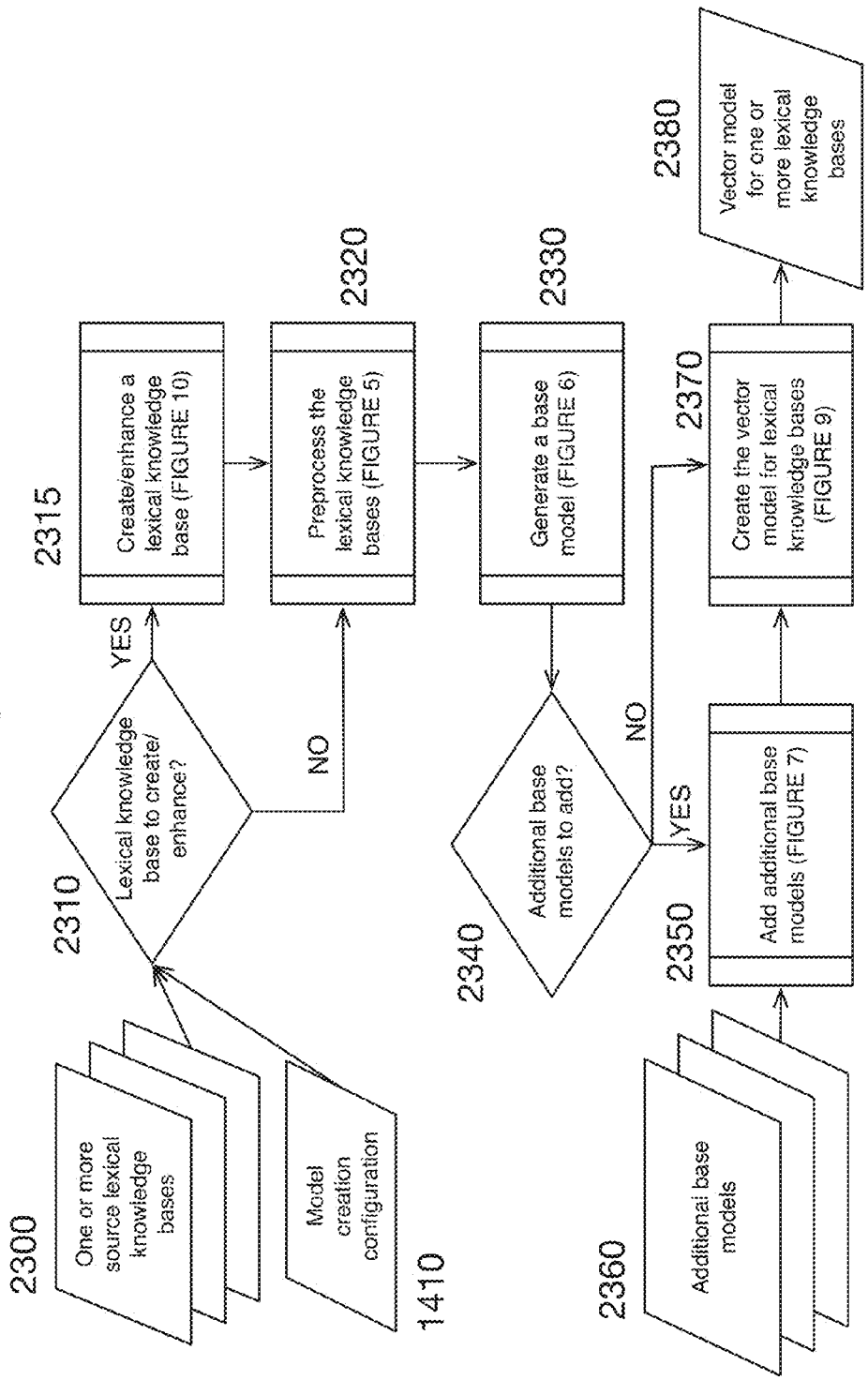
FIG. 13 shows a flow diagram detailing a general process for creating vector models from one or more lexical knowledge bases according to one embodiment of the present invention.

General Process for Creating Vector Models from One or More Lexical Knowledge Bases The general process for creating vector models from one or more lexical knowledge bases is presented in FIG. 13. The inputs to this process are one or more source lexical knowledge bases (2300) and a model creation configuration (1410).

If it is necessary to create or enhance a lexical knowledge base from the source materials, this process is performed (2315); this process is described in greater detail in FIG. 10. The resulting lexical knowledge base is then preprocessed (2320); this process is described in greater detail in FIG. 5. If there are no more lexical knowledge bases to create or enhance (2310), a base model is generated from the set of knowledge bases output from preprocessing (2330); this process is described in greater detail in FIG. 6. Next all additional base models (2360) are added (2340). If there are additional models to add (2360), all are added (2350); this process is described in greater detail in FIG. 7. Once all additional models have been added. The vector model for lexical knowledge bases is generated (2370); this process is described in greater detail in FIG. 9. If no additional base models need to be added, the process proceeds directly to the creation of the vector model (2370). The output of this process is a vector model for one or more lexical knowledge bases (2380).

Generating a Vector Model for a Broad Coverage Corpus

Figure 14:
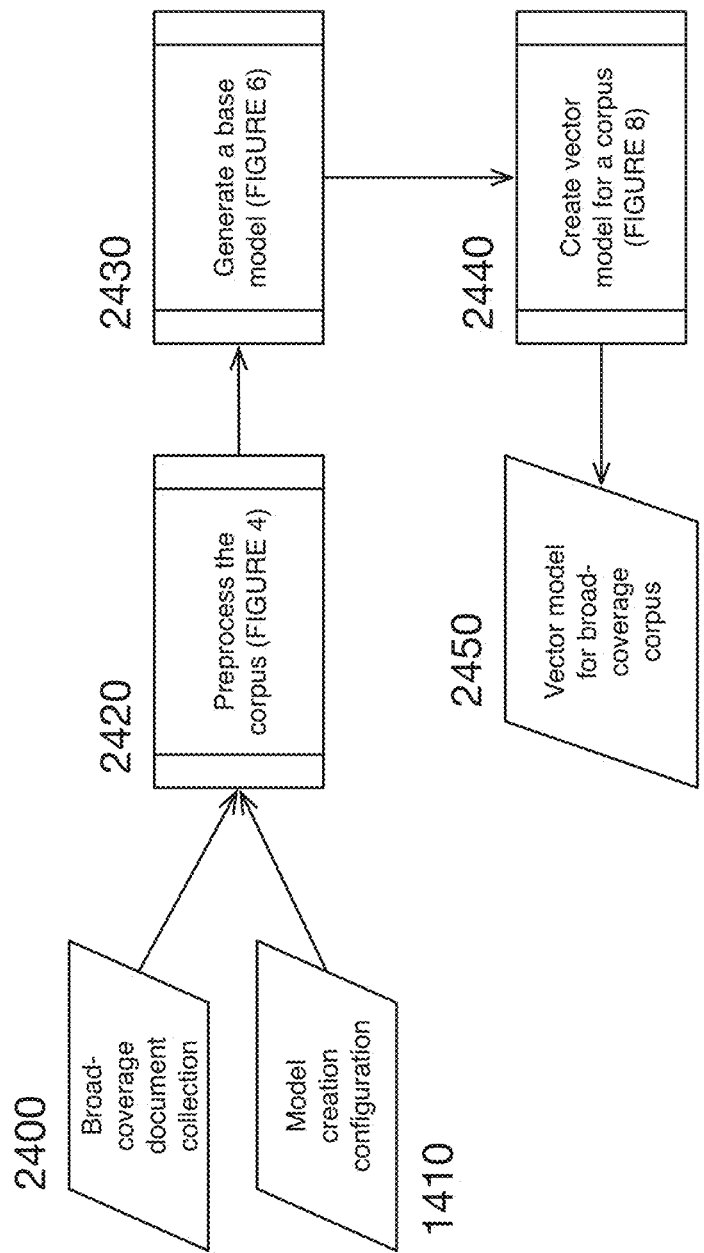
FIG. 14 shows a flow diagram detailing a process of generating a vector model for a broad coverage corpus according to one embodiment of the present invention.

The process of generating a vector model for a broad coverage corpus is presented in FIG. 14. The inputs to this process are a broad coverage document collection ("corpus") (2400) and a model creation configuration (1410). The first step of this process is to preprocess the corpus (2420); this process is described in greater detail in FIG. 4. The next step of this process is to generate a base model (2430); this process is described in greater detail in FIG. 6. Finally, a vector model is generated from the base model (2440); this process is described in greater detail in FIG. 8.

The output of this process is a vector model for a broad coverage corpus (2450). Generating a vector model for a custom corpus that also incorporates frequencies from a broad coverage corpus.

Figure 15:
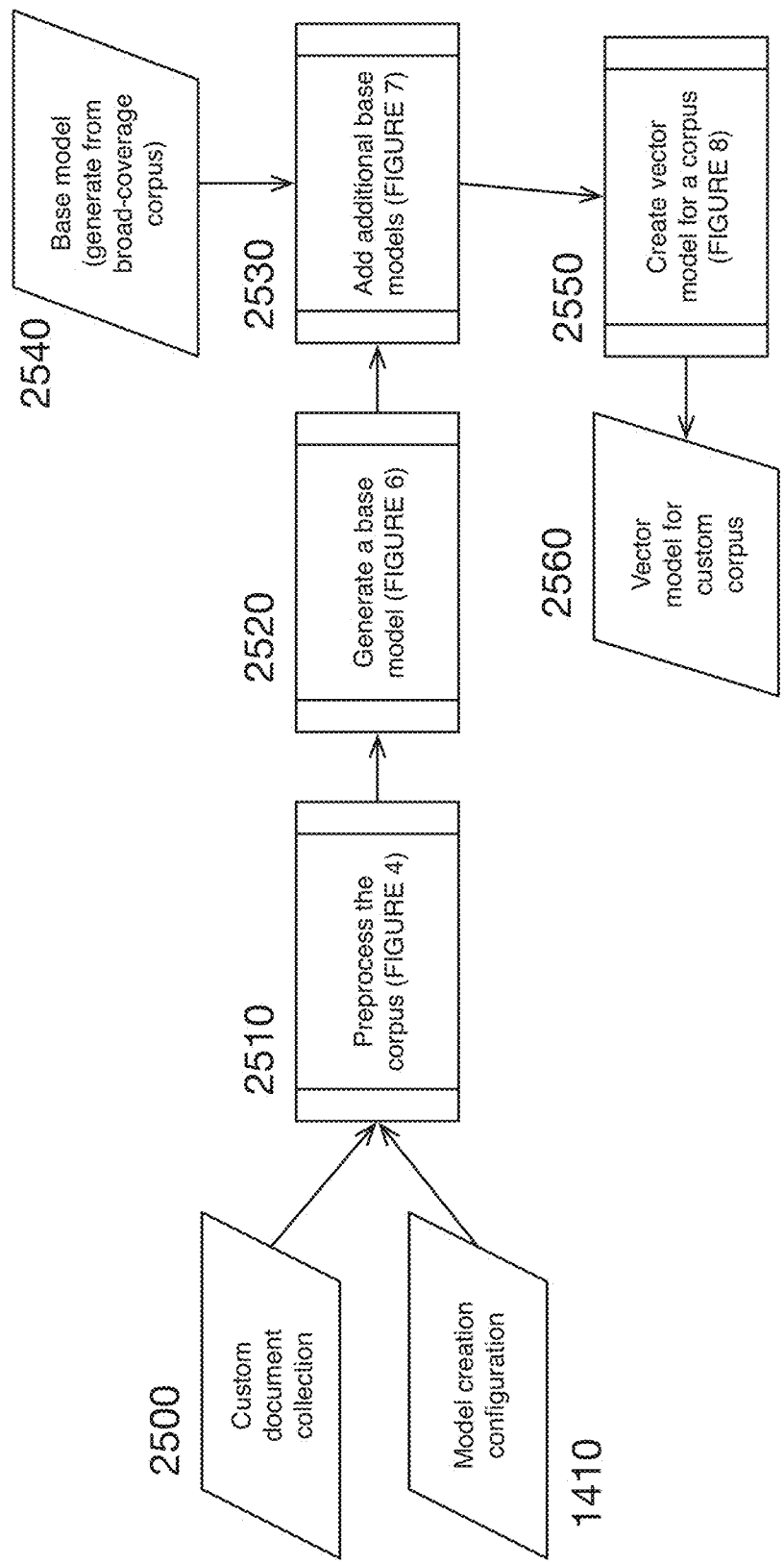
FIG. 15 shows a flow diagram detailing a process of generating a vector model for a custom corpus that also incorporates statistics from a broad coverage corpus according to one embodiment of the present invention.

The process of generating a vector model for a custom corpus that also incorporates statistics from a broad coverage corpus is presented in FIG. 15. The inputs to this process are a custom document collection ("corpus") (2500) and a model creation configuration (1410). The first step of this process is to preprocess the corpus (2510); this process is described in greater detail in FIG. 4. The next step is to generate a base model (2520); this process is described in greater detail in FIG. 6.

The next step is to add (2530) a base model from a broad-coverage corpus (2540); this process is described in greater detail in FIG. 7.

Finally, the combined base models are processed to create a vector model (2550); this process is described in greater detail in FIG. 8. The output of this process is a vector model for a custom corpus (2560).

Generating a Vector Model for a Broad Coverage Lexical Knowledge Base.

Figure 16:
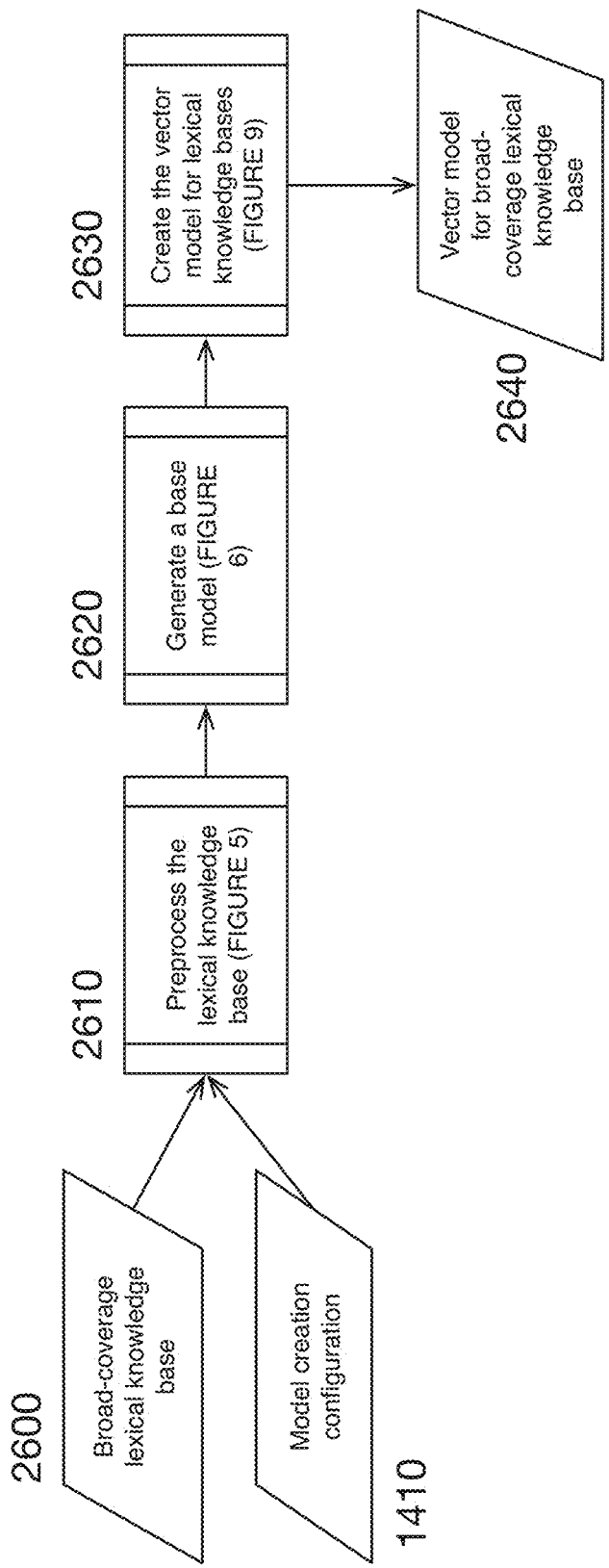
FIG. 16 shows a flow diagram detailing an exemplary process of generating a vector model for a broad coverage lexical knowledge base according to one embodiment of the present invention.

The process of generating a vector model for a broad coverage lexical knowledge base is presented in FIG. 16.

The inputs to this process are a broad coverage lexical knowledge base (2600) and a model creation configuration (1410).

The first step is to preprocess the lexical knowledge base (2610); this process is described in greater detail in FIG. 5.

The next step is to generate a base model (2620); this process is described in greater detail in FIG. 6. Finally, a vector model is generated from the base model (2630); this process is described in greater detail in FIG. 9. The output of this process is a vector model for a broad coverage lexical knowledge base (2640).

Generating a Vector Model for a Custom Lexical Knowledge Base that also Incorporates Statistics from a Broad Coverage Lexical Knowledge Base.

Figure 17:
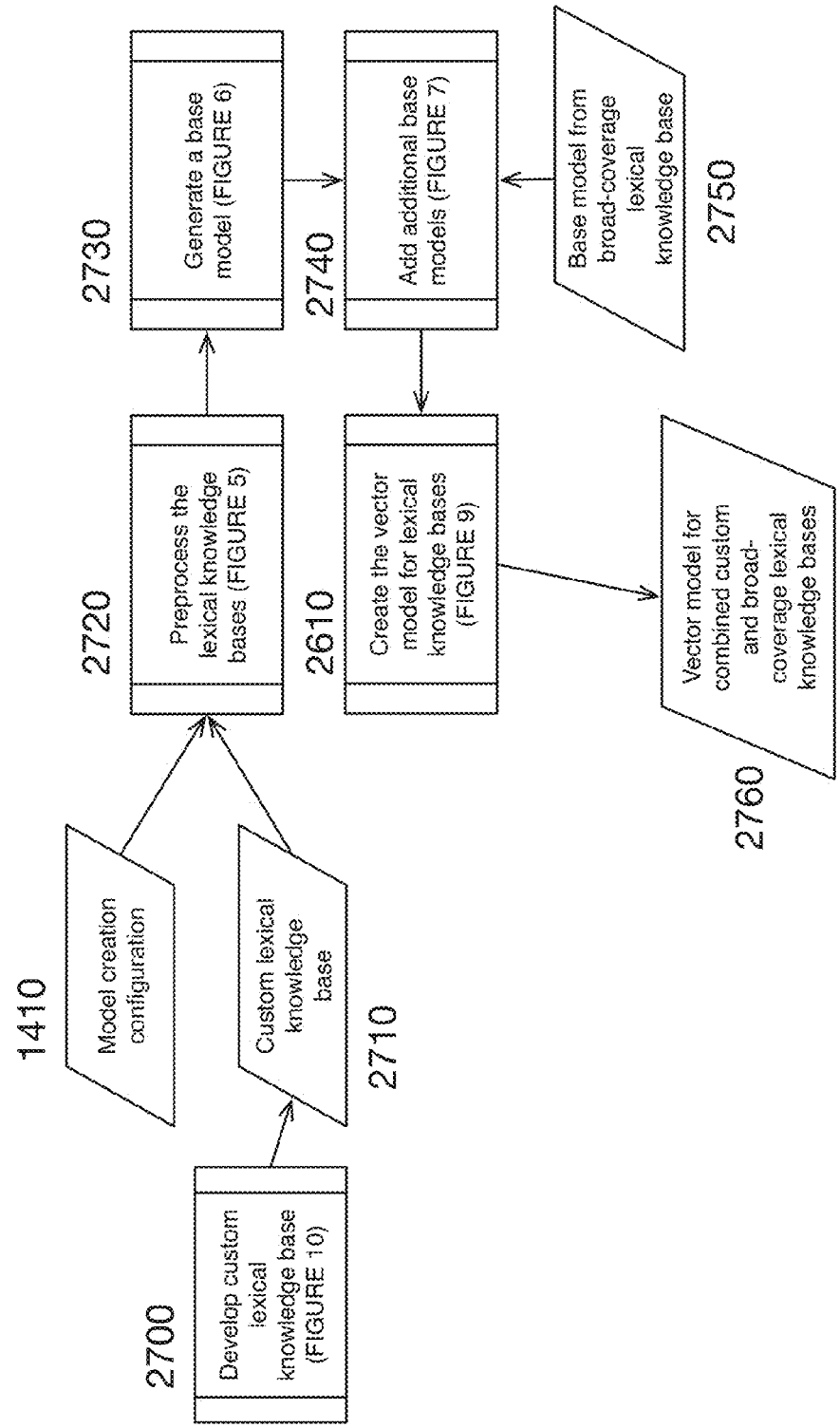
FIG. 17 shows a flow diagram detailing an exemplary process of generating a vector model for a custom lexical knowledge base that also incorporates statistics from a broad coverage lexical knowledge base according to one embodiment of the present invention.

The process of generating a vector model for a custom lexical knowledge base that also incorporates statistics from a broad coverage lexical knowledge base is presented in FIG. 17. This process requires that a custom lexical knowledge base (2700) be created; this process is described in greater detail in FIG. 10. The inputs to this process are the custom lexical knowledge base (2710) and a model creation configuration (1410). The first step is to preprocess the custom lexical knowledge base (2720); this process is described in greater detail in FIG. 5. Next a base model is created (2730); this process is described in greater detail in FIG. 6. Next any additional base models are added (2740); this process is described in greater detail in FIG. 7.

In this instance, the additional base model is a base model from a broad coverage lexical knowledge base (2750). Finally, a vector model is generated from the combined base models (2610); this process is described in greater detail in FIG. 9.

The output of this process is a vector model for a custom lexical knowledge base combined with a broad coverage lexical knowledge base (2760).

Figure 18:
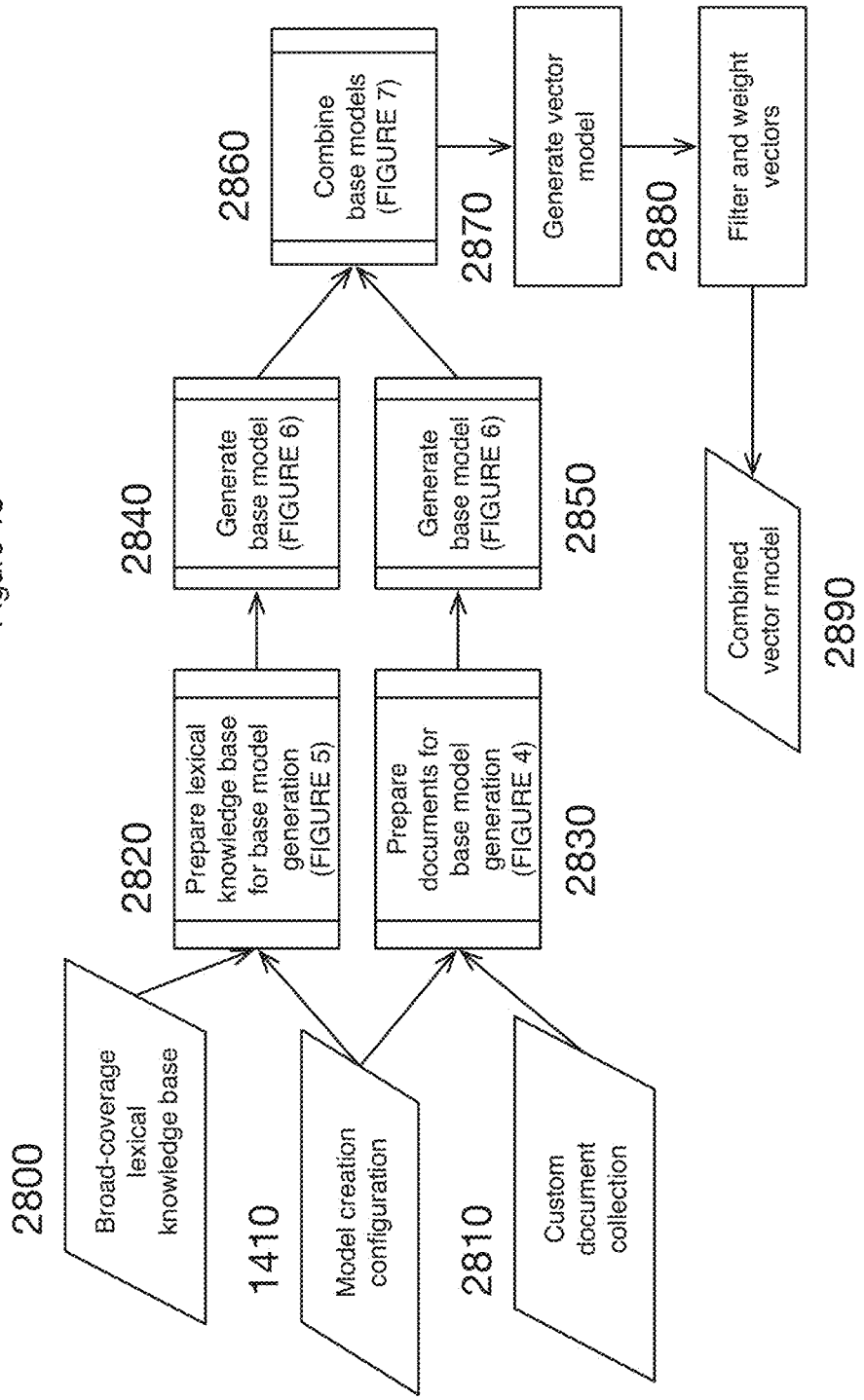
FIG. 18 shows a flow diagram detailing an exemplary process of generating the data for an application that incorporates a vector model for a broad coverage lexical knowledge base and a custom document collection with a semantic mapping according to one embodiment of the present invention.

Generating the data for an application that incorporates a vector model for a broad coverage lexical knowledge base and a custom document collection with a semantic mapping The process of generating the data for an application that incorporates a vector model for a broad coverage lexical knowledge base and a custom document collection with a semantic mapping is presented in FIG. 18.

There are three inputs to this process: a broad coverage lexical knowledge base (2800); a custom document collection ("corpus") (2810); and a model creation configuration (1410).

There are two workflows within this process: a lexical knowledge base generation workflow and a custom document collection workflow.

The lexical knowledge base generation workflow starts by preparing a lexical knowledge base that is used for base model generation (2820); this process is described in greater detail in FIG. 5. Next the base model is generated (2840); this process is described in greater detail in FIG. 6. The custom document collection workflow starts by preparing the documents for base model generation (2830); this process is described in greater detail in FIG. 4. Next a base model is created from these documents (2850); this process is described in greater detail in FIG. 6. Now the lexical knowledge base and custom document collection base models are combined (2860); this process is described in greater detail in FIG. 7. A vector model is generated from the combined base models (2870); and the vector model is filtered and weighted (2880). The output of this process is a combined vector model (2890).

Semantic Matching Run-Time

The process for performing semantic matching in run-time is presented in FIG. 19. The inputs to this process are the inputs (text fragments) to be evaluated (2900); the application-specific data (2910); and the run-time configuration (2905). The first step is to create one or more candidates for string similarity (2915); and then to score these candidates for string similarity (2920).

The preferred embodiment for string similarity is character n-gram similarity. If a vector model is available to perform semantic similarity (2925), then a candidate pool for vector model retrieval is created (2930); and these candidates are scored for semantic similarity (2935). The resulting scored candidates from string and semantic similarity and then post-processed to combine the scores for each candidate; and remove duplicates (2940). If k-nearest neighbor processing is used (2950), normative forms from the semantic mappings are ranked by weights computed by adding the scores of the best-scoring k variants in the candidate pool to their corresponding normative forms.

The output of this process is a list of the best-scoring semantic mappings with their associated scores (2960).

It will be apparent to one of skill in the art that described herein is a novel apparatus, system and method for an apparatus, system and method for application-specific and customizable semantic similarity measurement. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

What is claimed is:

1. A method for application-specific and customizable text similarity measurement, the method comprising the steps of:
determining, by a computer, a string similarity score of at least two texts based upon a string similarity database stored on said computer, said at least two texts comprising at least one input text and at least one target text;
determining, by said computer, a semantic similarity score of the at least two texts based upon a semantic similarity database stored on said computer, the semantic similarity score being determined as the sum of a distance between at least one term of each said at least two texts;
mapping, by said computer, said at least one target text and its respective canonical representations in a mappings database stored on said computer;
combining, by said computer, the string similarity score and the semantic similarity score of the at least two texts where the combined score is a weighted sum of the string similarity score and the semantic similarity score and where said at least two texts are ranked for similarity by sorting by their respective combined string and semantic similarity scores and where said texts that are included in the mappings database are also scored by similarity of their canonical forms; and
producing, by the computer, an output signal defining a list of best-scoring semantic mappings with associated scores, said computer adapted to transform said output signal into a display signal viewable on a monitor.

2. The method according to claim 1, further comprising the step of determining string similarity as the weighted substring similarity of the at least two texts.

3. The method according to claim 2, further comprising the step determining a plurality of sizes of substring.

4. The method according to claim 3, further comprising the step of determining substring weighting with tf-idf.

5. The method according to claim 4, further comprising the step of determining substring similarity with cosine distance.

6. The method according to claim 1, further comprising the step of determining a semantic similarity score of the at least two texts as the sum of a semantic distance between at least two terms of the at least two texts.

7. The method according to claim 6, further comprising the step of selecting a structured lexical knowledge base that contains definitions.

8. The method according to claim 7, further comprising the step of re-representing said structured lexical knowledge base in a computationally tractable form.

9. The method according to claim 8, where the structured lexical knowledge base comprises object-attribute-value (OAV) triplets that relate terms (objects) to properties (values) by relations (attributes).

10. The method according to claim 9 further comprising the step of constructing a first gloss corpus consisting of the definitions for each said term in the lexical knowledge base.

11. The method according to claim 10 further comprising the constructing a second gloss corpus including at least one expanded definition for each said term in said structured lexical knowledge base by adding to each of respective definition of said terms found in a specified set of semantic relationships to each respective term.

12. The method according to claim 11 further comprising the step of extracting said semantic relationships from the set of OA V triplets.

13. The method according to claim 12, where said semantic relations between the said terms used to construct the second gloss corpus include terms related by synonymy; hypernymy and hyponymy; and morphological derivation.

14. The method according to claim 1, where the string similarity data comprises a database of substrings of texts and statistics that relate said substrings to variant forms of each canonical form, and where said substrings are character ngrams of the target texts, respectively.

15. The method according to claim 14, where there are a plurality of sizes of character ngrams.

16. The method according to claim 15, where the character ngrams have tf-idf weights.

17. The method according to claim 16, further comprising the step of correlating each character ngram to each of the target texts in which it is respectively found.

18. The model according to claim 14, further comprising the step of creating a sample set of documents from a preferred set of collected documents.

19. The method according to claim 18, further comprising the step of converting the sample set of documents to a standardized format.

20. The method according to claim 19, further comprising the step of removing text markup from the converted sample set of documents.

21. The method according to claim 20, further comprising the step of converting characters to a uniform character set.

22. The method according to claim 21 where the sample set of documents is segmented into sections.

23. The method according to claim 22 where the sample set of documents is tokenized where said tokens are single or multiple word tokens.

24. The method according to claim 23 where the tokens are transformed by stemming or baseforming.

25. The method according to claim 24 where the tokens are transformed by capitalization folding.

26. The method according to claim 25 where specified tokens are ignored.

27. The method according to claim 26 where tokens are decorated with additional data.

28. The method according to claim 27 where said additional data is selected from the group consisting of part-of-speech, syntactic, named-entity and semantic labels.

29. The method according to claim 28 where multiword-tokens are identified as a sequence of two or more tokens with high mutual information.

30. The method according to claim 29 where the multi-word-tokens are found in a predefined list of multi word tokens.

31. The method according to claim 30 further comprising the step of determining co-occurrence statistics to create a base model of term co-occurrence statistics from the tokenized text based on a configuration.

32. The method according to claim 31 where the number of terms to the left and right of a given focus term to use for term co-occurrence counts.

33. The method according to claim 32 where the semantic similarity data module uses a semantic indexing vector space model of term co-occurrence.

34. The method according to claim 33, further comprising the step of creating a first vector space model based upon the structured lexical knowledge base and the first gloss corpus.

35. The method according to claim 34, where the first vector space model is also based upon the second gloss corpus.

36. The method according to claim 35, where the first vector space model is a "first-order" vector space model of term co-occurrences from at least one of a broad-coverage structured lexical knowledge base or a domain- or application-specific lexical knowledge base that contains glosses of said terms.

37. The method according to claim 36, further comprising the step of creating a second vector space model of term co-occurrences for each term defined in the lexical knowledge base by summing co-occurrence vectors of each term found in the expanded gloss corpus for the given term.

38. The method according to claim 37, further comprising the step of removing low frequency co-occurrences.

39. The method according to claim 38, further comprising the step of removing low variance co-occurrences.

40. The method according to claim 39, further comprising the step of creating a third vector space model based upon the sample set of documents, said third vector space model being a "first-order" vector space model.

41. The method according to claim 40, further comprising the step of creating a fourth vector space model.

42. The method according to claim 41, where said fourth vector space model includes a combination of one or more vector space models drawn from a pool of lexical knowledge base and document collection vector space models.

43. The method according to claim 42 where the step of creating the fourth vector space model is a weighted sum of at least one of the second and third vector space models.

44. The method according to claim 43 where semantic distance is determined using the fourth vector space model of weighted term co-occurrence statistics.

45. The method according to claim 44, where the fourth vector space model uses random indexing.

46. The method according to claim 45, where said weighted term co-occurrence statistics includes pointwise mutual information.

47. The method according to claim 46, where the semantic distance includes a measure of correlation cosine distance.

48. The method according to claim 47, further comprising the step of combining vector distances using a best alignment strategy whereby said terms in the at least two texts are allowed by contributing their respective distances only once and only with their respective highest matching scores.

49. The method according to claim 48, where the at least two texts are ranked for similarity by sorting by their respective combined string and semantic similarity scores.

50. The method according to claim 49, where a score of canonical forms is determined by a k nearest neighbor score.

51. The method according to claim 50, where the score of canonical forms is determined as the sum of the scores of the k closest matching variant strings of canonical forms and further where k is a fixed number.

52. The method according to claim 51, where the canonical form is the normalized form of the target text.

53. The method according to claim 52, where metadata and categories are associated with canonical forms.

54. The method according to claim 53 where metadata includes the frequency of occurrence of each combination of metadata and categories.

55. The method according to claim 1, where the mappings database storing the at least one text and its respective canonical representation comprises semantic mappings between said text and its respective normative forms.

56. The method according to claim 55 where the string similarity databases comprises substrings of texts and statistics that relate said substrings to variant forms.

57. A data processing system, comprising a processor, a memory coupled to the processor, and a non-transitory computer readable storage device coupled to the processor, said storage device containing program code executable by the processor via the memory to implement a method for application-specific and customizable text similarity measurement, the processing system comprising:

first logic executable by the processor for determining a string similarity score of at least two texts based upon a string similarity database, said at least two texts comprises at least one input text and at least one target text;

second logic executable by the processor for determining a semantic similarity score of the at least two texts based upon a semantic similarity database, the semantic similarity score being determined as the sum of a distance between at least one term of each said at least two texts;

third logic executable by the processor for mapping said at least one target text and its respective canonical representations in a mappings database stored in said memory;

fourth logic executable by the processor for combining the string similarity score and the semantic similarity score of the at least two texts where the combined score is a weighted sum of the string similarity score and the semantic similarity score and where said at least two texts are ranked for similarity by sorting by their respective combined string and semantic similarity scores and where said texts that are included in the mappings database are also scored by similarity of their canonical forms; and an output signal defining a list of best-scoring semantic mappings with associated scores, said program code executable to transform said output signal into a display signal viewable on a monitor.

58. A system, comprising a processor, a memory coupled to the processor, and a non-transitory computer readable storage device coupled to the processor, said storage device containing program code executable by the processor via the memory to implement a method useful for application-specific and customizable text similarity measurement, the system comprising:

a first computer store containing at least two texts defining string similarity of each of said texts, said at least two texts comprising at least one input text and at least one target text, where said defined string similarity is stored as a string similarity score in said first computer store;

a second computer store interconnected to the first computer store and housing a semantic similarity score of the at least two texts based the first computer store, where the semantic similarity score is determined as the sum of a distance between at least one term of each said at least two texts;

a third computer store interconnected to the first and second computers stores where said at least one target text and its respective canonical representations are mapped and housed in said third computer store; and an output signal defining a list of best-scoring semantic mappings with associated scores, said program code executable to transform said output signal into a display signal viewable on a monitor, wherein the string similarity score and the semantic similarity score of the at least two texts where the combined score is a weighted sum of the string similarity score and the semantic similarity score and where said at least two texts are ranked for similarity by sorting by their respective combined string and semantic similarity scores and where said texts that are included in the mappings database are also scored by similarity of their canonical forms.

* * * * *